(12) United States Patent
Granger

(10) Patent No.: US 9,637,257 B2
(45) Date of Patent: May 2, 2017

(54) WEATHER SHELTER FOR USE IN A REMOTE MANUFACTURING YARD

(71) Applicant: L'Air Liquide, Societe Anonyme Pour l'Etude et l'Exploitation des Procedes Georges Claude, Paris (FR)

(72) Inventor: Claude Granger, Beloeil (CA)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 14/284,660

(22) Filed: May 22, 2014

(65) Prior Publication Data

US 2014/0345206 A1    Nov. 27, 2014

Related U.S. Application Data

(60) Provisional application No. 61/827,096, filed on May 24, 2013, provisional application No. 61/827,103,
(Continued)

(51) Int. Cl.
*E04G 5/12* (2006.01)
*B65B 23/00* (2006.01)
(Continued)

(52) U.S. Cl.
CPC ............... *B65B 23/00* (2013.01); *A47B 3/06* (2013.01); *A47B 37/00* (2013.01); *B01D 3/32* (2013.01); *B01J 19/325* (2013.01); *B21B 39/02* (2013.01); *B21B 39/04* (2013.01); *B21B 39/16* (2013.01); *B21B 39/34* (2013.01); *B23K 9/0206* (2013.01); *B23K 9/173* (2013.01); *B23K 9/23* (2013.01);
(Continued)

(58) Field of Classification Search
CPC .... B05B 15/1214; Y10S 52/12; Y10S 135/90; Y10S 135/901; E04G 3/24; E04G 3/243; E04G 21/242; E04G 5/12; E04G 2005/125; E04G 23/0225; E04H 9/00; E04H 15/04; A01M 31/025; A01M 31/02; B24C 3/062
USPC .......................... 52/63; 135/99; 182/187, 188
See application file for complete search history.

(56) References Cited

U.S. PATENT DOCUMENTS 2,066,984 A * 1/1937 Lamb ........................ E04G 5/06
182/113
2,414,538 A * 1/1947 Lamb ........................ E04G 5/06
182/113
(Continued)

OTHER PUBLICATIONS

International Search Report and Written Opinion for PCT/IB2014/001937, mailed Jul. 21, 2015.
(Continued)

*Primary Examiner* — Daniel Cahn
(74) *Attorney, Agent, or Firm* — Justin K. Murray

(57) ABSTRACT

A weather shelter for providing protection during assembly of a column at a remote manufacturing yard is provided. The weather shelter can include a frame mounted to a hanging platform, and extending upwards from the hanging platform, the hanging platform supported by the column; and a protective covering mounted on the frame having a side covering and a top covering, the protective covering configured to provide an inner atmosphere within the protective covering protected from external elements when the protective covering is secured to the column.

19 Claims, 30 Drawing Sheets

Related U.S. Application Data filed on May 24, 2013, provisional application No. 61/921,164, filed on Dec. 27, 2013.

(51) Int. Cl.

| | | |
|---|---|---|
| B21B 39/02 | (2006.01) |
| E04H 7/22 | (2006.01) |
| E04H 15/04 | (2006.01) |
| B65B 55/00 | (2006.01) |
| B65B 55/20 | (2006.01) |
| B23P 23/06 | (2006.01) |
| E04H 5/02 | (2006.01) |
| B23Q 3/18 | (2006.01) |
| E04G 21/24 | (2006.01) |
| E04H 9/00 | (2006.01) |
| B21B 39/04 | (2006.01) |
| B21B 39/16 | (2006.01) |
| B21B 39/34 | (2006.01) |
| B66F 5/04 | (2006.01) |
| A47B 3/06 | (2006.01) |
| A47B 37/00 | (2006.01) |
| B61B 13/12 | (2006.01) |
| B66D 1/60 | (2006.01) |
| E04G 3/24 | (2006.01) |
| E04G 1/18 | (2006.01) |
| B66C 1/66 | (2006.01) |
| B65G 67/02 | (2006.01) |
| B01D 3/32 | (2006.01) |
| F25J 3/04 | (2006.01) |
| B66C 1/10 | (2006.01) |
| B01J 19/32 | (2006.01) |
| E04G 1/36 | (2006.01) |
| E04G 5/14 | (2006.01) |
| E04G 21/28 | (2006.01) |
| E04F 11/18 | (2006.01) |
| E04G 1/15 | (2006.01) |
| E04G 5/06 | (2006.01) |
| E04G 21/14 | (2006.01) |
| B23K 9/02 | (2006.01) |
| B23K 9/173 | (2006.01) |
| B23K 9/23 | (2006.01) |
| B65B 65/00 | (2006.01) |
| B21D 5/12 | (2006.01) |
| B21C 37/08 | (2006.01) |
| B21D 5/14 | (2006.01) |
| B21C 37/083 | (2006.01) |
| E04H 5/10 | (2006.01) |
| B23K 101/06 | (2006.01) |
| B23K 103/02 | (2006.01) |

(52) U.S. Cl.
CPC ............... *B23P 23/06* (2013.01); *B23Q 3/18* (2013.01); *B61B 13/12* (2013.01); *B65B 55/00* (2013.01); *B65B 55/20* (2013.01); *B65B 65/003* (2013.01); *B65G 67/02* (2013.01); *B66C 1/10* (2013.01); *B66C 1/66* (2013.01); *B66D 1/60* (2013.01); *B66F 5/04* (2013.01); *E04F 11/181* (2013.01); *E04G 1/15* (2013.01); *E04G 1/18* (2013.01); *E04G 1/362* (2013.01); *E04G 3/24* (2013.01); *E04G 5/061* (2013.01); *E04G 5/12* (2013.01); *E04G 5/14* (2013.01); *E04G 21/142* (2013.01); *E04G 21/242* (2013.01); *E04G 21/28* (2013.01); *E04H 5/02* (2013.01); *E04H 7/22* (2013.01); *E04H 9/00* (2013.01); *E04H 15/04* (2013.01); *F25J 3/0489* (2013.01); *B01J 2219/32275* (2013.01); *B21C 37/083* (2013.01); *B21C 37/0815* (2013.01); *B21D 5/12* (2013.01); *B21D 5/14* (2013.01); *B23K 2201/06* (2013.01); *B23K 2203/02* (2013.01); *E04G 2005/125* (2013.01); *E04G 2021/248* (2013.01); *E04H 5/10* (2013.01); *F25J 2290/42* (2013.01); *Y10T 29/49631* (2015.01); *Y10T 29/49817* (2015.01); *Y10T 29/49826* (2015.01); *Y10T 29/49998* (2015.01); *Y10T 29/5137* (2015.01)

(56) References Cited

U.S. PATENT DOCUMENTS

| | | | | |
|---|---|---|---|---|
| 2,649,680 | A * | 8/1953 | Brown | 56/329 |
| 3,007,541 | A * | 11/1961 | Mast, Jr. | E04G 21/28 135/121 |
| 3,116,808 | A * | 1/1964 | Riley | 182/129 |
| 3,198,285 | A * | 8/1965 | Nerlich | 182/128 |
| 3,407,825 | A * | 10/1968 | Doyle | 135/98 |
| 3,452,764 | A * | 7/1969 | Bell | 135/124 |
| 3,566,991 | A * | 3/1971 | Proulx | E04G 1/20 182/129 |
| 3,715,843 | A * | 2/1973 | Ballinger | 52/3 |
| 3,762,110 | A * | 10/1973 | Boss, Jr. | 52/63 |
| 3,783,906 | A * | 1/1974 | Matherne | F16L 13/02 135/900 |
| 3,889,698 | A * | 6/1975 | Roessl | E04H 15/28 135/116 |
| 3,991,583 | A * | 11/1976 | Scurlock | E21B 41/06 405/193 |
| 4,056,902 | A * | 11/1977 | Ziegler, Jr. | E04H 15/04 182/188 |
| 4,285,354 | A * | 8/1981 | Beavers | 135/135 |
| 4,429,764 | A * | 2/1984 | Park | E04G 23/002 182/129 |
| 4,505,286 | A * | 3/1985 | Madion | 135/90 |
| 4,632,138 | A * | 12/1986 | Irwin | E04H 15/001 135/143 |
| 4,852,687 | A * | 8/1989 | Hittler | B08B 15/026 182/129 |
| 4,939,803 | A * | 7/1990 | Waters | A47C 7/66 5/113 |
| 4,979,589 | A * | 12/1990 | Sugiyama | E04G 5/12 182/138 |
| 5,011,710 | A * | 4/1991 | Harrison | 427/142 |
| 5,022,199 | A * | 6/1991 | Horii et al. | 52/123.1 |
| 5,038,889 | A * | 8/1991 | Jankowski | E04G 5/12 182/129 |
| 5,127,492 | A * | 7/1992 | Preston | E04G 1/14 182/152 |
| 5,211,125 | A * | 5/1993 | Garland | B24C 3/062 114/222 |
| 5,218,982 | A * | 6/1993 | Kenji | E04H 15/04 135/90 |
| 5,291,695 | A * | 3/1994 | Healy | B24C 3/065 451/89 |
| 5,327,993 | A * | 7/1994 | Stark, Sr. | 182/129 |
| 5,355,823 | A * | 10/1994 | Goldbach | B05B 15/1296 114/222 |
| 5,367,841 | A * | 11/1994 | Smith et al. | 451/89 |
| 5,408,770 | A * | 4/1995 | Suzuki | E04G 5/12 160/368.1 |
| 5,427,199 | A * | 6/1995 | Jorgensen | B24C 3/062 182/142 |
| 5,522,186 | A * | 6/1996 | Jarman | E04H 15/04 182/187 |
| 5,613,543 | A * | 3/1997 | Walton | E04G 5/12 135/119 |
| 5,678,654 | A * | 10/1997 | Uzawa | E04G 1/15 182/130 |
| 5,688,323 | A * | 11/1997 | Kane | B05B 13/005 118/326 |
| 5,775,979 | A * | 7/1998 | Coke et al. | 451/87 |

(56) References Cited

U.S. PATENT DOCUMENTS

| | | | | |
|---|---|---|---|---|
| 5,778,999 | A * | 7/1998 | Nealeigh | E04G 21/28 182/129 |
| 5,819,474 | A * | 10/1998 | Strom | 52/4 |
| 5,930,948 | A * | 8/1999 | Daniel | 47/23.1 |
| 6,003,630 | A * | 12/1999 | Whalen | E04G 3/20 182/150 |
| 6,070,371 | A * | 6/2000 | Myrick | E04G 21/28 160/352 |
| 6,178,979 | B1 * | 1/2001 | Galloway | A47B 37/04 108/50.12 |
| 6,360,490 | B1 * | 3/2002 | Cotriss | B08B 15/02 52/138 |
| 6,450,362 | B1 * | 9/2002 | Laurion | C05F 17/0205 220/485 |
| 6,817,444 | B1 * | 11/2004 | Shinas | E01D 19/106 14/74 |
| 7,219,680 | B1 * | 5/2007 | Gresock | A01M 31/025 135/139 |
| 7,699,140 | B2 * | 4/2010 | Beggrow | A62B 35/0056 182/10 |
| 7,992,350 | B2 * | 8/2011 | Vriens | E04B 1/3211 52/40 |
| 8,671,963 | B2 * | 3/2014 | Shih | 135/90 |
| 2002/0074030 | A1 * | 6/2002 | Raines et al. | 135/96 |
| 2002/0078988 | A1 * | 6/2002 | Valpredo | 135/90 |
| 2003/0131539 | A1 * | 7/2003 | Burford | E04B 1/32 52/64 |
| 2005/0139423 | A1 * | 6/2005 | Smoljo | E04G 5/12 182/129 |
| 2006/0157300 | A1 * | 7/2006 | Smoljo | E04G 5/12 182/129 |
| 2006/0225960 | A1 * | 10/2006 | Ferlin | E04G 1/15 182/138 |
| 2006/0283103 | A1 * | 12/2006 | Chen | E04H 15/18 52/63 |
| 2007/0000188 | A1 * | 1/2007 | Smushkovich | 52/167.1 |
| 2007/0011955 | A1 * | 1/2007 | Richard | E04G 5/12 52/79.1 |
| 2007/0028438 | A1 * | 2/2007 | Missey | E04H 15/001 29/558 |
| 2007/0144570 | A1 * | 6/2007 | Cooper | 135/90 |
| 2009/0020363 | A1 * | 1/2009 | Ingalls | E04G 5/00 182/113 |
| 2010/0252083 | A1 * | 10/2010 | Ogle | E04H 15/04 135/90 |
| 2012/0299339 | A1 * | 11/2012 | Birch | A01M 31/02 297/188.01 |
| 2012/0304551 | A1 * | 12/2012 | Preg | A01M 31/025 52/65 |
| 2013/0061898 | A1 * | 3/2013 | Webster | E04H 15/008 135/156 |
| 2013/0118540 | A1 * | 5/2013 | Hayes | E04H 15/001 135/96 |
| 2013/0272784 | A1 * | 10/2013 | Chau | E04G 5/12 403/338 |
| 2013/0318889 | A1 * | 12/2013 | Brown et al. | 52/122.1 |
| 2014/0075731 | A1 * | 3/2014 | Miranda | F16B 2/248 29/426.2 |
| 2014/0150835 | A1 * | 6/2014 | Heilman | A01M 31/025 135/90 |
| 2015/0176292 | A1 * | 6/2015 | Crookshank | E04G 5/12 182/82 |

OTHER PUBLICATIONS

Helmuth Hausen, et al, "Tieftemperaturtechnik," Springer Verlag, Dec. 31, 1985, pp. 479-483.

Gao Macy, "04 OffshorePipe Tubular & Pressure Vessel Fabrication Line," Apr. 11, 2014, URL:https://www.youtube.com/watch?v=g-UILFInT3M, Retrieved from Internet Jul. 8, 2015.

Anonymous, "Hugh Smith Engineering—Vertical Plate Bender," Jul. 27, 2007, URL:http://www.hughsmith.co.uk/vertical_plate_bender.htm, Retrieved from Internet Jul. 8, 215 www.Carellcorp.com, "Highly Accurate, Dependable Metal Fabricating Machines," Dec. 5, 2009, URL:http://www.carellcorp.com/vertical.htm, Retrieved from Internet Dec. 5, 2009.

Bogdan Maleta, "Fractional distillation column (DWC-column)," Dec. 31, 2013, URL:https://www.youtube.com/watch?v=fBR24z9eB6Y, Retrieved from Internet Jul. 8, 2015.

Trevor Nicholaidis, "Pressure Vessel Fabricators.wmv," Sep. 19, 2011, URL:https://www.youtube.com/watch?v=bPiY7Gdw7ZA, Retrieved from Internet Jul. 8, 2015.

* cited by examiner

FIG. 15
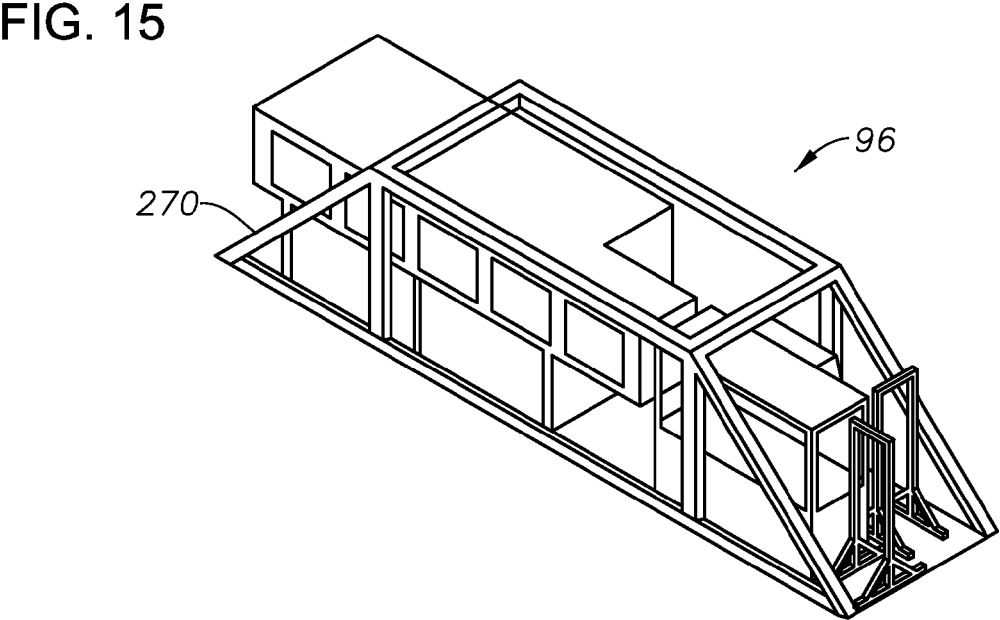
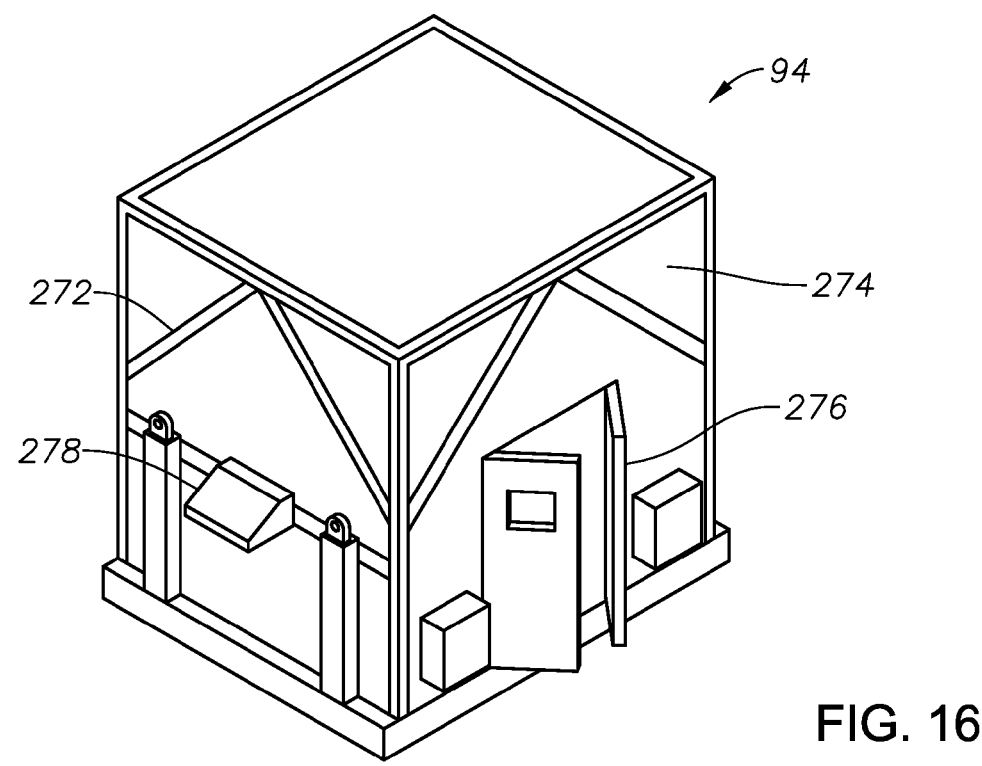
FIG. 16

FIG. 18
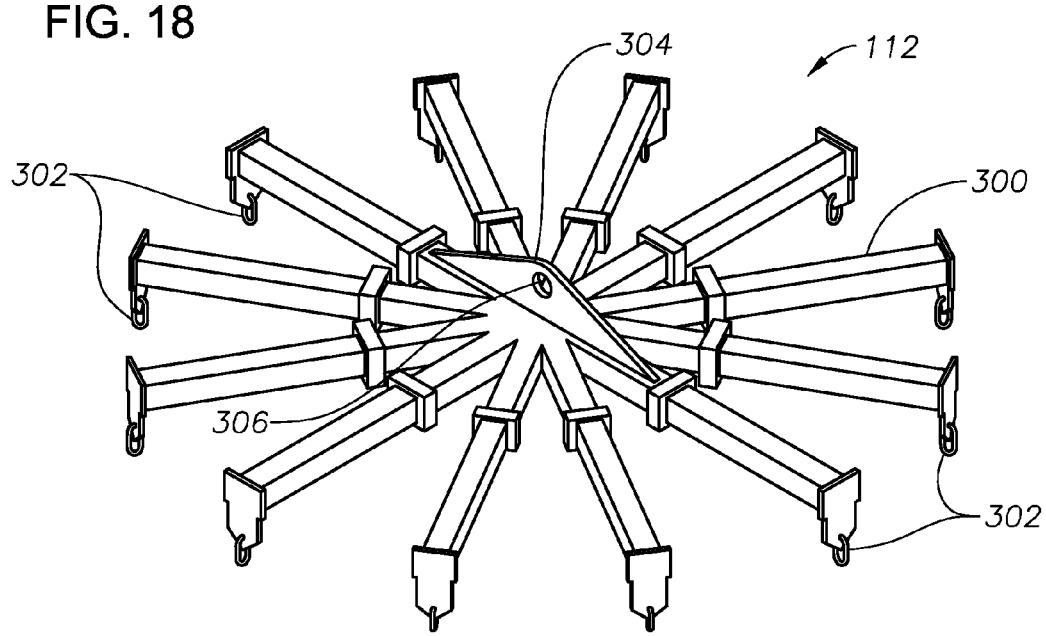
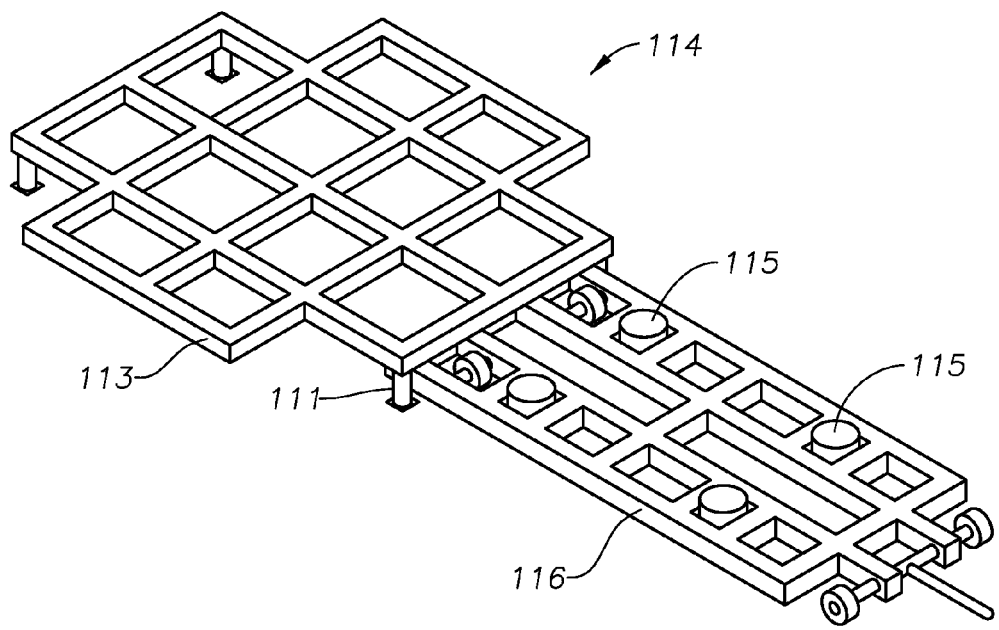
FIG. 19

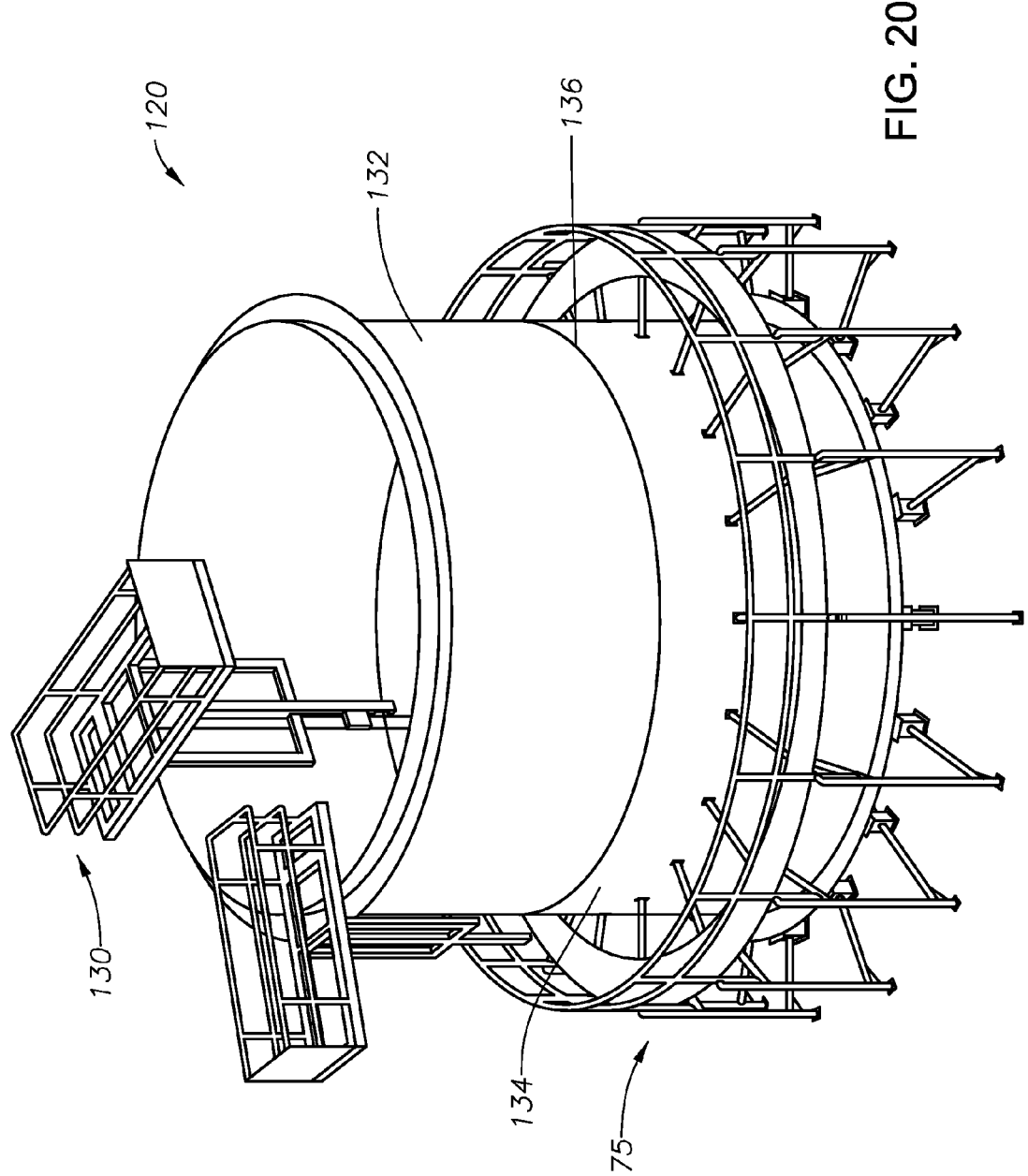

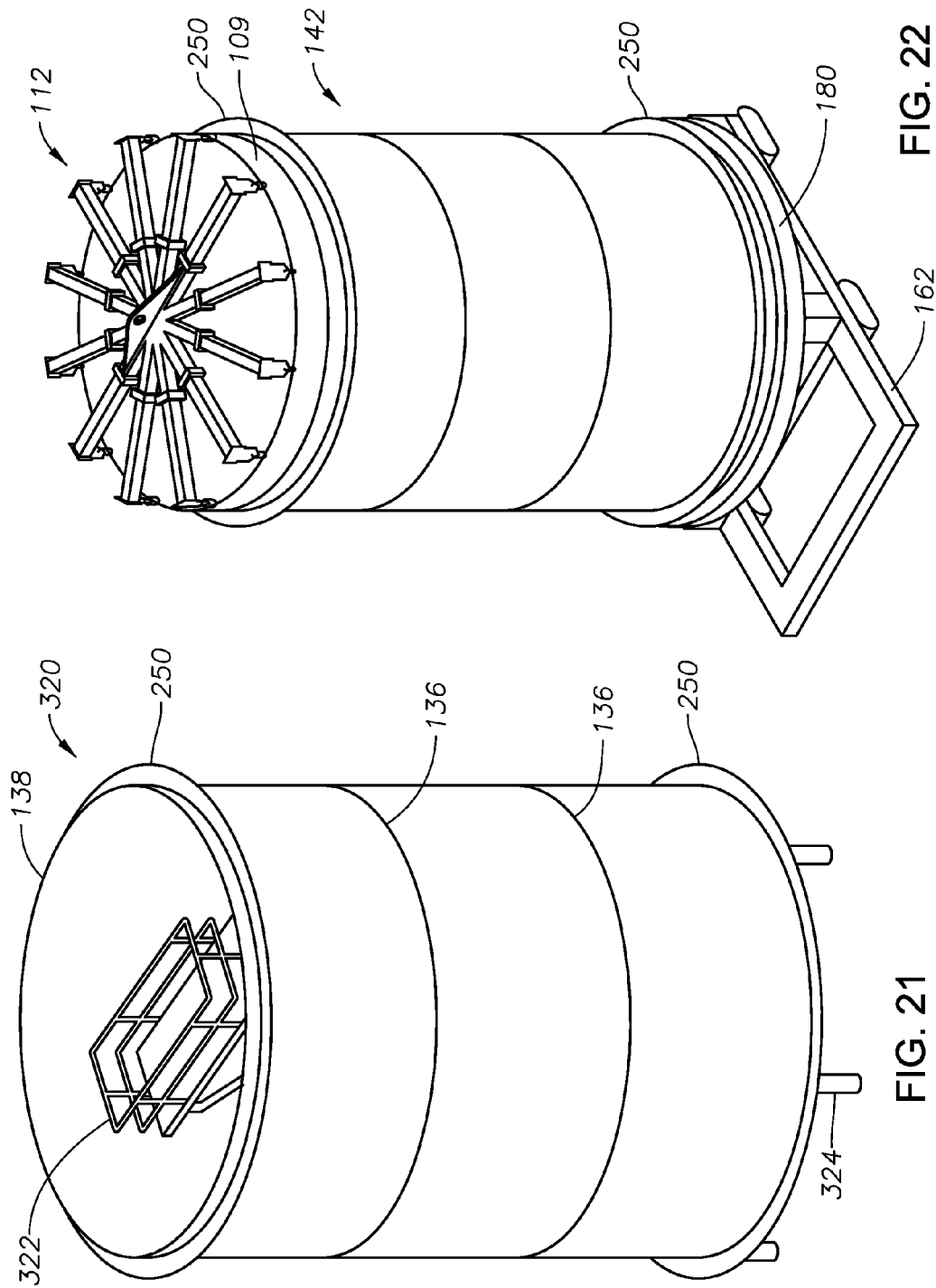

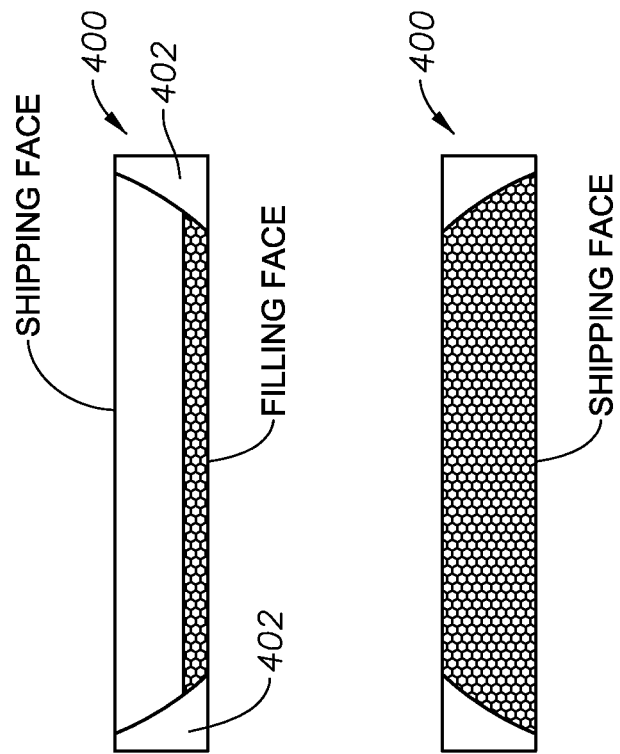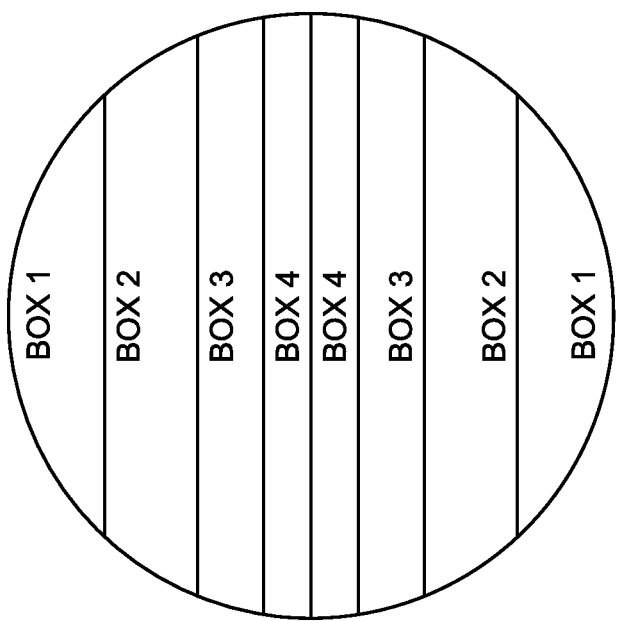
FIG. 30

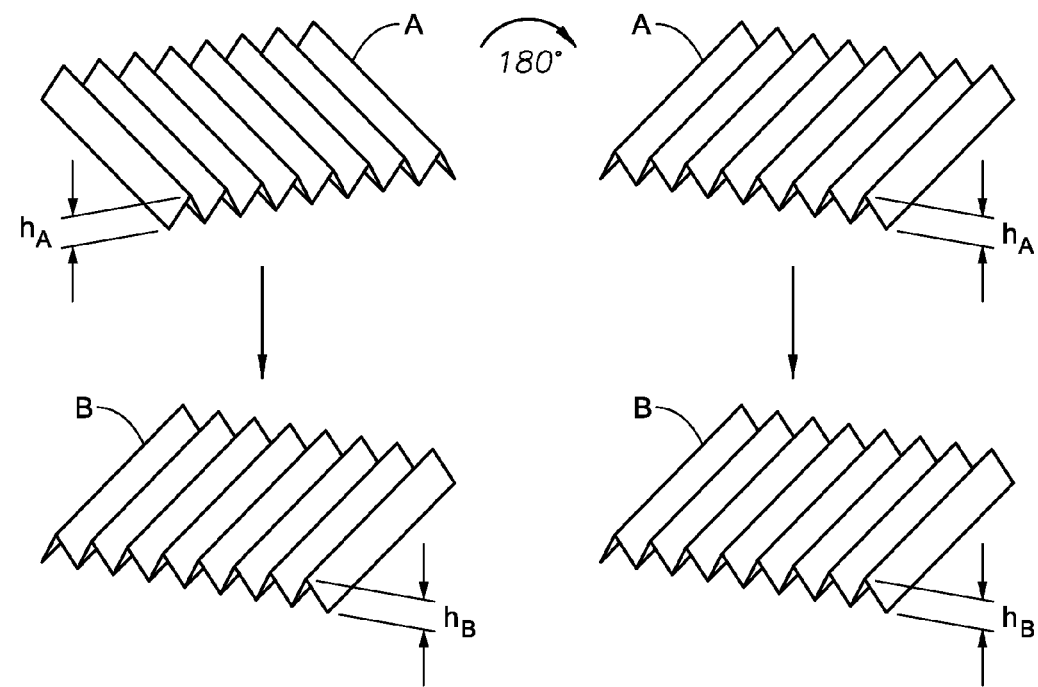
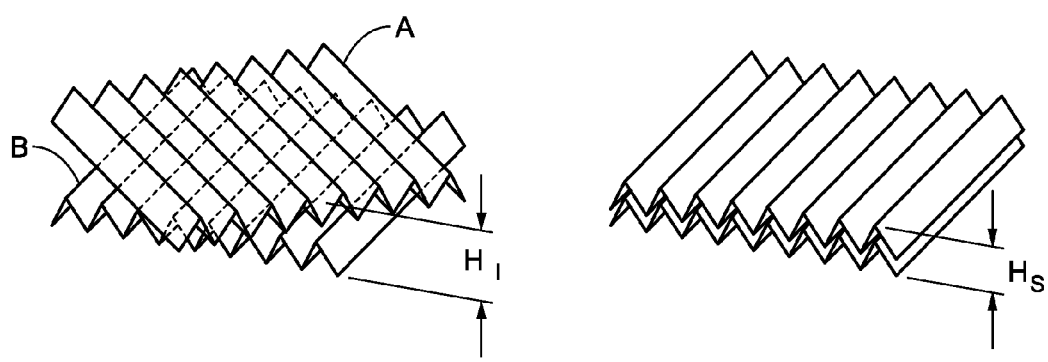
Install
$H_I = h_A + h_B$
Shipping
$H_S = h_A + thickness_B$
FIG. 32

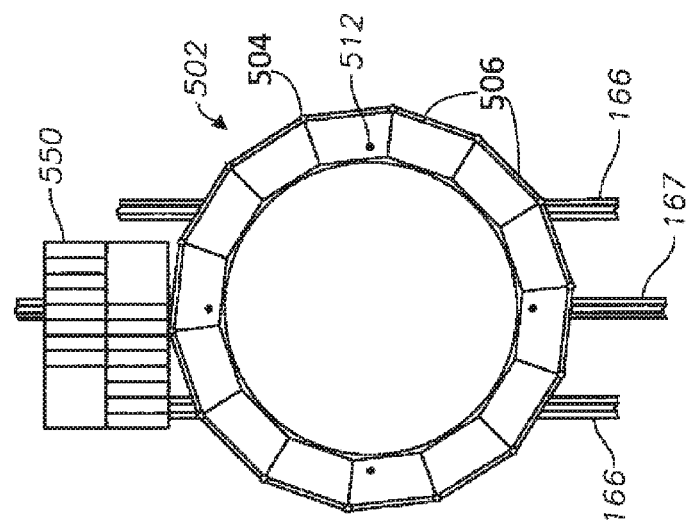
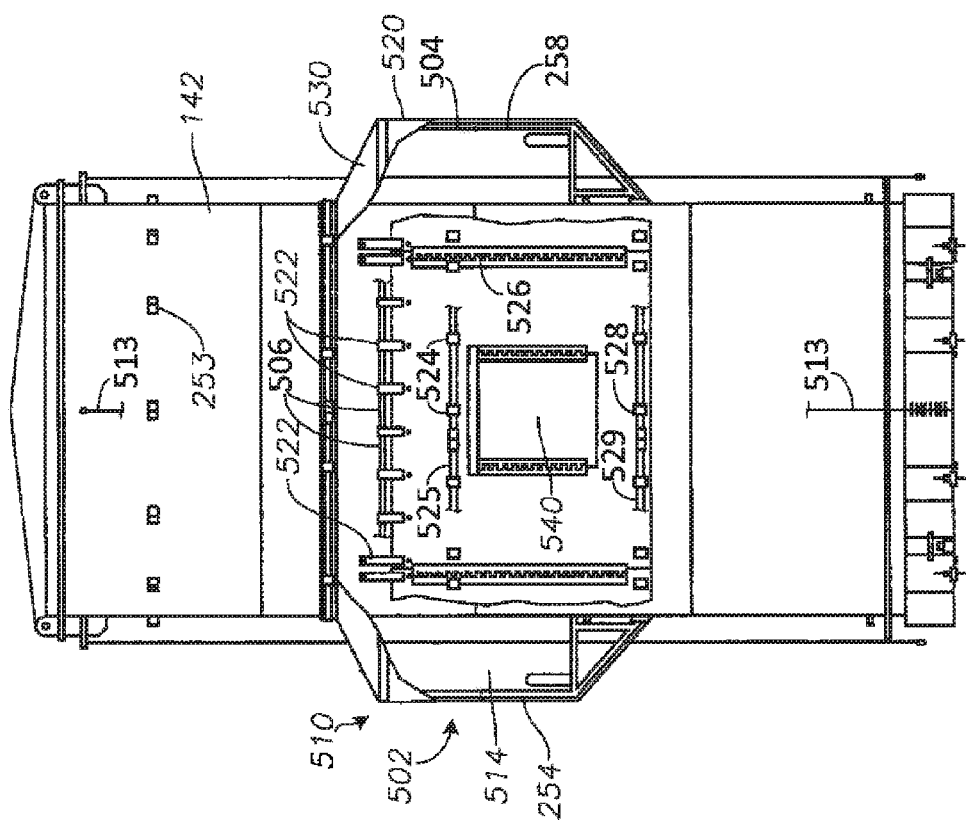
FIG. 34A
FIG. 34B

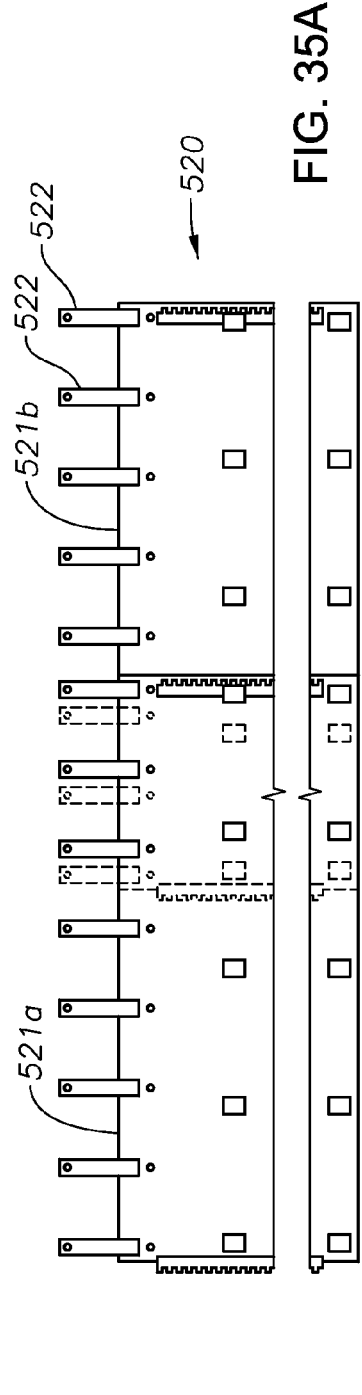
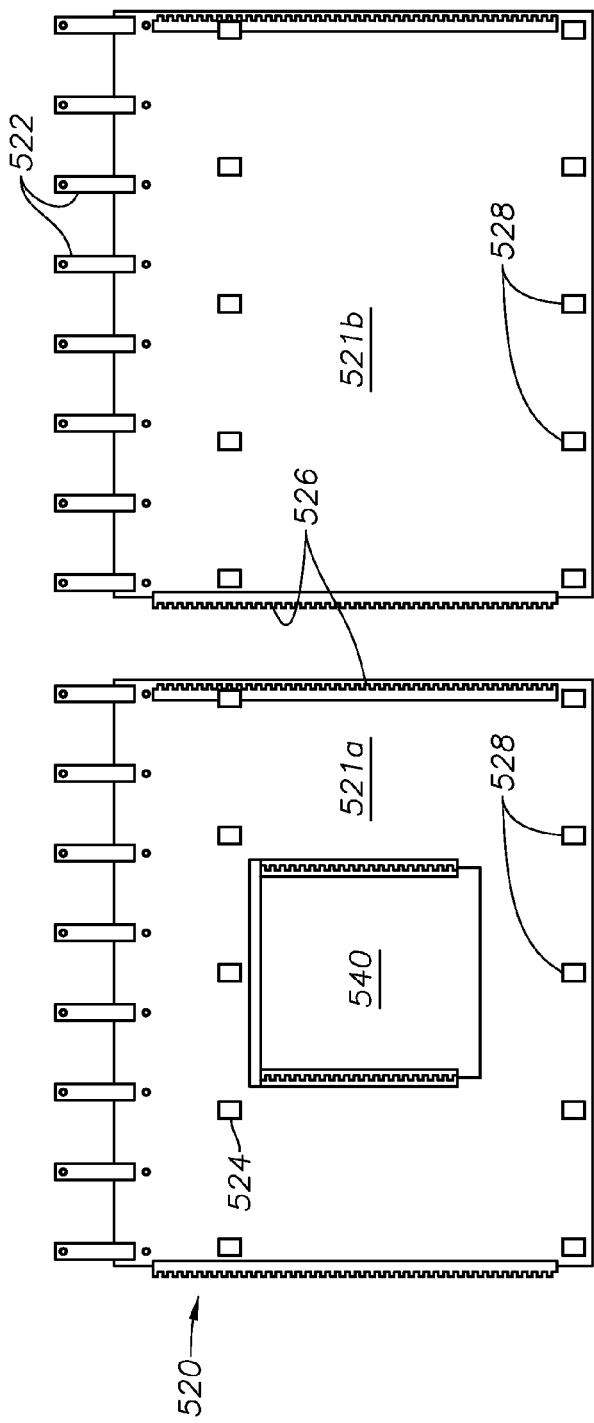
FIG. 35A
FIG. 35B

US 9,637,257 B2

WEATHER SHELTER FOR USE IN A REMOTE MANUFACTURING YARD

RELATED APPLICATIONS

This application claims priority to U.S. Provisional Application Ser. No. 61/827,096 filed on May 24, 2013; U.S. Provisional Application Ser. No. 61/827,103 filed May 24, 2013; and U.S. Provisional Application Ser. No. 61/921,164 filed Dec. 27, 2013, all of which are hereby incorporated by reference in their entireties.

TECHNICAL FIELD OF THE INVENTION

The present invention relates to a device for use when building air separation units in a remote location using a mobile manufacturing yard.

BACKGROUND OF THE INVENTION

Air separation units (ASUs) are typically constructed in fabrication shops and then transported to their installation sites via roads and waterways. As such, the roads, waterways, and bridge clearances create a practical limit on the sizes of the ASUs. However, the market's need for ASUs has grown tremendously, with future projections rising even more. As such, the industry is facing a serious challenge in trying to meet these needs in a cost effective manner.

In the past, if a user required a larger amount of oxygen than what an ASU could typically deliver, the installation would just add additional ASUs until the need was satisfied (e.g., two 2,000 tpd instead of one 4,000 tpd). While this setup can provide the necessary flows, it creates additional problems related to maintenance and costs more than operating one ASU.

Therefore, there is clearly a need for a manufacturing method and device that would allow for very large ASUs to be constructed and delivered to places of need, particularly when those places are in remote areas that are not conducive to large trucks. Areas that are landlocked and away from large navigable rivers also suffer from these aforementioned drawbacks.

SUMMARY OF THE INVENTION

Embodiments of the present invention are directed to a device and a method that satisfies at least one of these needs. Certain embodiments of the present invention relate to the use of a remote manufacturing yard (RMY). The advantages provided include:

provide manufacturing flexibility and reactivity by allowing additional capacities to the current manufacturing capacities;

serve all parts of the world, specifically landlocked areas locations; and minimize the logistic efforts and reduce costs associated with oversized equipment transporting over great distances.

In one embodiment of the invention, a remote manufacturing yard configured to build a cryogenic distillation column for use in an air separation unit ("ASU") is provided. In one embodiment, the remote manufacturing yard can include a fabrication facility comprising an enclosure and configured to assemble a packed column section of a low pressure column, wherein the packed column section preferably has a diameter exceeding five meters. The fabrication facility further can also include a vertical plate roller configured to vertically roll a plate to create a partial shell; a lifting device configured to transport the partial shell from the vertical plate roller to an assembly table, the assembly table configured to support two or more partial shells simultaneously; a first weld machine configured to weld the two or more partial shells together to form a course while keeping the two or more partial shells stationary; a column section assembly area having a second weld machine disposed therein, the column section assembly area configured to stack an upper course on a lower course, wherein the second weld machine is configured to weld the upper course and lower course together to form a column section while keeping the upper course and the lower course stationary; a distributor installation area configured to receive at least one column section and install a distributor within the column section to form a distributor column section; and a packing installation area configured to receive the distributor column section and install packing within the distributor column section to form a packed column section.

In optional embodiments of the remote manufacturing yard:

the remote manufacturing yard can also include a column assembly area having a floor and an absence of an enclosure, the column assembly area configured to receive a plurality of packed column sections, wherein the floor is configured to support the weight of the plurality of packed column sections;

the remote manufacturing yard can further include a crane disposed within the column assembly area, the crane operable to stack the plurality of packed column sections on each other to form a column;

the remote manufacturing yard can further include a set of rails configured to mate with a roller system of a movable platform;

the remote manufacturing yard can further include a winch secured to the floor of the column assembly area, the winch configured to move the movable platform from the fabrication facility to the column assembly area;

the remote manufacturing yard can further include a means for moving the packed column section from the fabrication facility to the column assembly area;

the remote manufacturing yard can further include a yard leveling base disposed on the floor, the yard leveling base configured to receive the plurality of packed column sections and provide leveling for the plurality of packed column sections if the floor is uneven;

the yard leveling base can have a washer-like shape;

the yard leveling base can further include a plurality of notches at its bottom that are configured to receive a lifting system to be placed within the notches and raise the level of the yard leveling base at the notch;

the yard leveling base is secured to the floor;

the first weld machine is configured to weld in a vertical direction and the second welding machine is configured to weld in a horizontal direction;

the fabrication facility can also include a dressing area configured to receive the course from the first weld machine, the dressing area having inner scaffolding and outer scaffolding configured to allow a user access to the inner and outer surface of the course;

the dressing area is configured to receive the course while the inner scaffolding and outer scaffolding are already erected;

the remote manufacturing yard can further include a course lifting device configured to transport the course to the dressing area, wherein the course lifting device can include a plurality of support arms each having a plate clamp attached thereto and a connector configured to accept a connection from an overhead crane such that the course lifting device, in conjunction with the overhead crane, is operable to move the course about the fabrication facility;

wherein the plate clamp is configured to be movable about the length of the support arm, such that the course lifting device is operable to move courses having differing diameters;

the remote manufacturing yard can further include a plate storage area; a plate loading area; and a means for transporting the plate from the storage area to the plate loading area;

wherein the means for transporting the plate to the plate loading area comprise a plate lifting device configured to lift the plate and an overhead crane configured to support and move the plate lifting device;

wherein the remote manufacturing yard can also include a packing fabrication area for creating packing, the packing fabrication area comprising: a press module disposed on a press module skid; and a washing system disposed on a washing system skid;

the remote manufacturing yard can further include a packing assembly area configured to receive packing from the packing fabrication area, the packing assembly area comprising a working table configured to allow for assembly of a packing assembly;

the remote manufacturing yard can further include a packing lifting device configured to lift and move the packing assembly from the working table to a packing pallet;

wherein the packing lifting device can include a central member, a plurality of lifting arms extending outward from the central member, and connector clips disposed on each lifting arm, the connector clips configured to engage with an adapter installed on a packing band, wherein the packing band is disposed about the circumference of the level of packing and is configured to keep the level of packing substantially circular.

the remote manufacturing yard can further include a trailer and a packing pallet configured to support a plurality of packing assemblies, wherein the trailer is operable to raise the packing pallet off the ground and support the weight of the packing pallet such that the packing pallet is movable about the remote manufacturing yard;

wherein the fabrication facility can include more than one building; and/or the remote manufacturing yard can further include a cleaning station configured to allow a user access to the inner surface of the column section, the cleaning station comprising: a cleaning station support configured to provide clearance underneath the column section; a means for raising and lowering the user about the inside of the column section.

In one embodiment of the invention, a method for fabricating cryogenic distillation columns in a remote manufacturing yard for use in an air separation unit (ASU) is provided. In one embodiment, the method can include the steps of: forming a first course, wherein the step of forming a first course can include the steps of: (a) obtaining a first plate; (b) rolling the first plate using a vertical plate roller such that the first plate is vertically rolled to create a first partial shell; (c) moving the first partial shell to an assembly table that is configured to support two or more partial shells simultaneously; (d) obtaining a second plate; (e) rolling the second plate using the vertical plate roller such that the second plate is vertically rolled to create a second partial shell; (f) moving the second partial shell to the assembly table that is configured to support two or more half shells simultaneously; and (g) arranging the first partial shell with the second partial shell and welding the first partial shell to the second partial shell using a first weld machine to form the first course while both the first partial shell and the second partial shell are stationary; forming a second course, wherein the step of forming a second course can include repeating steps (a)-(g) to form the second course; forming a packed column section, wherein the step of forming the packed column section can include the steps of: fitting and tacking the first course with the second course and welding the first course to the second course using a second weld machine to form a first column section; (i) installing a distributor within the first column section to form a distributor column section; (j) installing packing within the distributor column section and above the distributor to form a packed column section; repeating steps (a)-(j) to form a plurality of packed column sections; and combining the plurality of packed column sections to form a column.

In optional embodiments of the method for fabricating cryogenic distillation columns in a remote manufacturing yard:

the step of stacking the plurality of packed column sections to form the column is done within a column assembly area comprising a floor and an absence of an enclosure, the column assembly area configured to receive the plurality of packed column sections, wherein the floor is configured to support at least the weight of the plurality of packed column sections;

the column assembly area can also include a crane disposed within the column assembly area, the crane operable to stack the plurality of packed column sections on each other to form a column;

the floor is substantially level;

the method can also include the step of moving a packed column section to the column assembly area using a combination of a set of rails configured to mate with a roller system of a movable platform and a means for moving the movable platform;

the means for moving the movable platform are selected from the group consisting of a winch, a forklift, and combinations thereof;

the means for moving the movable platform can include a winch, wherein the winch is secured to the floor of the column assembly area, the winch configured to move the movable platform to the column assembly area;

the method can also include the step of leveling the column in the column assembly area using a yard leveling base;

the yard leveling base is configured to allow for a packed column section of a column to be placed on a top surface of the yard leveling base, the yard leveling base further comprising a bottom surface configured to maintain substantial contact with the ground of a remote manufacturing yard, wherein the yard leveling base is adapted to adjust the level of the top surface of the yard leveling base to account for unevenness or slope of the ground of the remote manufacturing yard;

the method can also include the step of moving the first course to a dressing area using a course lifting device;

the method can also include the step of installing a roundness ring about the circumference of the first course, the roundness ring configured to provide support to the first course such that the first course maintains a substantially cylindrical shape;

the method can also include the step of installing a plurality of lifting lugs to the roundness ring, the lifting lugs configured to allow the first course to be picked up by a crane in a column assembly area;

steps a-j are conducted in a fabrication facility having an enclosure;

the fabrication facility is a clean facility;

the method can also include the step of creating packing in a packing creation area for creating packing, the packing creation area comprising: a press module disposed on a press module skid; and a washing system disposed on a washing system skid;

step (j) can also include installing the packing in loose packing strips;

step (j) can also include installing a block of packing strips at a time, wherein the block of packing strips is comprised of at least 5 packing strips;

the method can also include the step of creating a vaporizer shell that is configured to house a vaporizer, wherein the step of forming the vaporizer shell can include repeating the steps of: forming the first course, forming the second course, and step (h);

a backing strip is used during step (h);

the method can also include the step of creating draining holes in the backing strip, wherein the drainage holes are configured to allow liquid that falls between the backing strip and the vaporizer shell to drain through the drainage holes during operation;

the drainage holes are round; and/or the method can also include of improving the curvature of the first course using a forming device.

In one embodiment of the invention, a method for fabricating a distillation column in a remote location away from a permanent manufacturing facility is provided. In one embodiment, the method can include the steps of: forming a plurality of column sections each having a diameter D, each column section comprising a plurality of courses that have been horizontally welded together, wherein each course is comprised of two or more partial shells that have been vertically welded together, wherein each of the two or more partial shells was created by vertically rolling a rectangular plate having a length of at least $$\left(\frac{1}{N}\pi \cdot D\right),$$

wherein N is the number of partial shells used to form the course; installing a distributor and packing in each column section to form a plurality of packed column sections; and stacking the plurality of packed column sections to form a column.

In optional embodiments of the method for fabricating cryogenic distillation columns in a remote location away from a permanent manufacturing facility:

the step of stacking the plurality of packed column sections to form the column is done within a column assembly area comprising a floor and an absence of an enclosure, the column assembly area configured to receive a plurality of packed column sections, wherein the floor is configured to support at least 40 tons;

the column assembly area can also include a crane disposed within the column assembly area, the crane operable to stack the plurality of packed column sections on each other to form a column;

the floor is substantially level;

the diameter of the first course exceeds 4.5 meters; and/or the diameter of the first course exceeds a length which can be transported by available roads.

In another aspect of the invention, an assembly table for use in a remote manufacturing yard is provided. In one embodiment, the assembly table is configured to be collapsible thereby allowing for a reduced footprint during transportation. In one embodiment, the assembly table can include a central support base; a plurality of arms attached to the central support base; a secondary support member attached to each arm configured to provide support for and give height to the assembly table when in use; and a centering guide attached to each arm, the centering guide configured to releasably receive a bottom portion of a partial shell, the centering guide located at a predetermined location of its own arm.

In optional aspects of the assembly table:

each arm extends radially outward from the central support base;

each arm is detachably connected to the central support base;

each secondary support member is detachably connected to its respective arm;

each arm is pivotally connected to the central support base;

each secondary support member is pivotally connected to its respective arm;

each arm is movable between an open position and a closed position;

the open position is substantially perpendicular to the longitudinal axis of the central support base;

the closed position is substantially parallel to the longitudinal axis of the central support base;

the secondary support member extends downward to the ground when the arm is pivoted to an open position;

each centering guide is welded to its respective arm;

each centering guide is movable about the length its respective arm, such that the centering guide may accommodate partial shells of varying diameters;

each centering guide is slidably attached to its respective arm, such that the centering guide may be moved about the length of the arm in order to accommodate partial shells of varying diameters;

the movement of one centering guide causes the remaining centering guides to move equally;

each centering guide can include a tapered opening configured to guide a partial shell into position;

each secondary support member is attached its respective arm at a distal location from the central support base;

each secondary support member can include an extendable length, such that each secondary support member can be extended individually to provide leveling on uneven surfaces;

the central support base is configured to be bolted to the ground when in use;

the central support base is substantially cylindrical;

the assembly table is configured to support the weight of a scaffolding assembly; and/or the assembly table can include means for attaching a scaffolding assembly.

In yet another aspect of the invention, a scaffolding assembly configured for use with an assembly table is provided. In one embodiment, the scaffolding assembly can include an inner scaffolding and an outer scaffolding, wherein the inner scaffolding and the outer scaffolding each include: a plurality of main posts having a lower end and an upper end; an extendible arm connected to each of the main posts, wherein the extendible arm is configured to extend substantially perpendicular from the main post; and a tertiary scaffolding support connected to the extendible arm and the main post, the tertiary support configured to transfer at least some of the force from the extendible arm to the main post, wherein the scaffolding assembly is configured to attach to the assembly table, such that the scaffolding assembly receives support from the assembly table.

In optional aspects of the scaffolding assembly:
the extendible arm is configured to move between a first position and a second position along a substantially horizontal plane;
the scaffolding assembly is configured to attach to different locations of the assembly table;
the scaffolding assembly can also include a secondary scaffolding support connected with the lower end of each of the main posts and a secondary support member of the assembly table such that the scaffolding receives structural support from the assembly table;
the scaffolding assembly can also include a secondary post connected to the tertiary support and extending upwards above the extendible arm;
the scaffolding assembly is configured to accommodate courses of varying diameters;
the scaffolding assembly is configured such that when the extendible arms of the inner scaffolding and the extendible arms of the outer scaffolding are fully extended, a gap exists between the ends of the extendible arms, wherein the gap is sufficiently large such that a course can be inserted or removed within the gap without touching the scaffolding;
the extendible arms are configured to lock in at various extension lengths such that the scaffolding assembly can accommodate courses of various diameters;
wherein the secondary scaffolding support is configured to adjust to various extension lengths such that the scaffolding assembly can accommodate courses of various diameters;
the scaffolding assembly can also include links disposed on each of the secondary posts, the links configured to secure handrails to the plurality of second posts;
the main posts are secured to the floor;
the scaffolding assembly can also include a walkway supported by the extendible arms;
wherein the walkway can include a first portion and a second portion, wherein the first portion is secured to the extendible arms and the second portion is supported by the extendible arms; and/or
wherein the height of the main posts is below a threshold level, such that the scaffolding assembly is configured to allow for a course to be moved in and out of the scaffolding assembly while the scaffolding assembly is assembled.

In yet another aspect of the invention, a scaffolding assembly configured for use with an assembly table is provided. In one embodiment, the assembly table is configured to be collapsible to allow for reduced footprint during transportation, the assembly table including a central support base; a plurality of arms attached to the central support base; a secondary support member attached to each arm for providing support for and giving height to the assembly table when in use; and a centering guide attached to each arm, the centering guide configured to releasably receive a bottom portion of a course, the scaffolding assembly having an inner scaffolding and an outer scaffolding, wherein the inner scaffolding and the outer scaffolding each can include a plurality of main posts having a lower end and an upper end; a secondary scaffolding support connected with the lower end of each of the main posts and a second support member of the assembly table such that the scaffolding receives structural support from the assembly table; an extendible arm connected with the upper end of each of the main posts, wherein the extendible arm is configured to extend substantially perpendicular from the main post between a first position and a second position; a tertiary scaffolding support connected to the extendible arm and the main post, the tertiary support configured to transfer some of the force from the extendible arm to the main post; and a secondary post connected to the tertiary support and extending upwards above the extendible arm, wherein the scaffolding is configured to accommodate courses of varying diameters.

In yet another aspect of the invention, a trolley for supporting the plate during vertical rolling of the plate is provided. In one embodiment, the trolley can include a support body configured to provide support for the trolley; a plurality of wheels configured to allow the trolley to move across a floor; a lifting arm supported by the support body, wherein the lifting arm is movable about a first position and a second position; a pump handle configured to raise the lifting arm between the first position and the second position; and a plate holder configured to move with the lifting arm and hold the plate in place relative to the trolley.

In optional aspects of the trolley:
the plate holder can also include a toggle clamp configured to increase the force that the plate holder applies to the plate;
the plate holder can also include a toggle clamp and a plate clamp, wherein the toggle clamp is configured to move the plate clamp such that the force applied by the plate holder to the plate is increased;
the trolley can also include a support bracket rotatably supported by the lifting arm, wherein the support bracket connects the plate holder and the lifting arm, such that the support bracket is configured to allow the plate holder to remain in substantially the same position as the lifting arm moves between the first position and the second position;
the trolley can also include a suspension, the suspension disposed between the plurality of wheels and the support body, wherein the suspension is configured to provide stability to the support body when the trolley is moving across an uneven floor;
the first position is substantially flat;
the angle produced by the lifting arm and the support body when the lifting arm is in the second position is less than 90°;
the plurality of wheels are configured to allow for 360° of movement; and/or
the trolley can also include a release configured to controllably lower the lifting arm towards the first position.

In yet another aspect of the invention, a method for vertically rolling a plate is provided. In one embodiment, the method can include the steps of obtaining a first trolley; positioning the plate in a vertical position; moving the first trolley beneath the plate; adjusting a lifting arm of the first trolley such that a plate holder of the first trolley is in a position that is conducive to accepting the plate; releasably securing the plate in place with the first trolley such that the first trolley moves in unison with the plate; obtaining a second trolley; moving the second trolley beneath the plate;

adjusting a lifting arm of the second trolley such that a plate holder of the second trolley is in a position that is conducive to accepting the plate; releasably securing the plate in place with the second trolley such that the second trolley moves in unison with the plate; and introducing the plate into a vertical rolling machine and rolling the plate to produce a rolled shell.

In optional aspects of the method for vertically rolling the plate:

The method for vertically rolling the plate can also include the step of releasing the plate from the first trolley anytime after the first trolley is no longer needed to provide support and before the first trolley interferes with the vertical rolling machine;
 prior to the step of introducing the plate into the vertical rolling machine, the lifting arm of the first and second trolley is adjusted such that the plate is approximately centered in the vertical rolling machine during rolling;
 using a third trolley to provide support for a portion of the plate after the plate has been partially rolled;
 the third trolley is either the first trolley after the plate has been released from the first trolley or another trolley;
 the first trolley is the trolley as described anywhere herein;
 the plate holder can also include a toggle clamp, wherein the toggle clamp is configured to move the plate clamp such that the force applied by the plate holder to the plate is increased;
 the first position is substantially flat;
 the angle produced by the lifting arm and the support body when the lifting arm is in the second position is less than 90°;
 the plurality of wheels are configured to allow for 360° of movement;
 the first trolley can also include a release configured controllably lower the lifting arm towards the first position;
 the first trolley can also include a support bracket rotatably supported by the lifting arm, wherein the support bracket connects the plate holder and the lifting arm, such that the support bracket is configured to allow the plate holder to remain in substantially the same position as the lifting arm moves between the first position and the second position; and/or
 the first trolley can also include a suspension, the suspension disposed between the plurality of wheels and the support body, wherein the suspension is configured to provide stability to the support body when the trolley is moving across an uneven floor.

In yet another aspect of the invention, a method for moving a packed column section about a remote manufacturing yard is provided. In one embodiment, the packed column section can include a first course, a second course, packing disposed within the first course and second course, and a plurality of distributors. In one embodiment, the method can include the steps of placing the packed column section on top of a movable platform, the movable platform configured to support and distribute the weight of the packed column section; and moving the packed column section from a first point to a second point, the second point being in an open area adapted for stacking a plurality of packed column sections on top of each other to form a column.

In optional aspects of the method for moving the packed column section about the remote manufacturing yard:

the movable platform is adjustable such that the movable platform can accommodate packed column sections of varying diameters;
 the movable platform can also include means for accommodating packed column sections of varying diameters;
 the movable platform can also include a base frame, table posts, and a movable beam, the table posts extending upwards, the movable beam connected to the base frame and the table posts, the movable beam adapted to provide lateral stability to the table posts via a brace;
 wherein the movable beam and table posts are configured to be movable about the base frame, such that the movable platform can accommodate packed column sections of varying diameters;
 the movable platform can also include a support base secured to the top of the table posts;
 the table posts are configured to mate with slots of the support base to provide an increase in stability;
 the table posts are configured to elevate the support base off the ground, thereby providing a user access to an underside of the packed column section;
 the support base is made from structural carbon steel;
 the support base can include a ring-like shape;
 the support base is configured to further distribute the weight of the packed column section across the movable platform;
 the packed column section is secured to the support base;
 the packed column section is secured to the support base using a welding stiffener;
 wherein the step of moving the packed column section from the first point to the second point further includes the steps of connecting the movable platform to a winch via a cable, and using the winch to apply a pulling force to move the packed column section to the second point;
 the movable platform can also include a plurality of a multi-ton rollers that are configured to mate with a set of rails disposed on the ground, such that the movable platform travels in a substantially straight path while being moved from the first point to the second point;
 the set of rails are disposed on the top surface of the ground; and/or
 the set of rails are disposed in a recess in the ground, such that the rails do not protrude above the top surface of the ground.

In yet another aspect of the invention, a movable platform for moving a packed column section about a remote manufacturing yard is provided. In one embodiment, the packed column section can include a first course, a second course, packing disposed within the first course and second course, and a distributor, the movable platform configured to support and distribute the weight of the packed column section. In one embodiment, the movable platform can include a base frame, table posts, and a movable beam, wherein the movable beam and table posts are configured to be movable about the base frame, such that the movable platform can accommodate packed column sections of varying diameters.

In optional aspects of the movable platform:

the table posts configured to mate with slots of a support base to provide an increase in stability;
 the table posts extend upward from the base frame and are configured to elevate the support base off the ground, thereby giving a user access to an underside of the packed column section;
 the support base can include an opening that is configured to give a user access to an underside of a packed column section when the packed column section is on top of the support base; and/or the movable platform can also include a plurality of a multi-ton rollers that are configured to mate with a set of rails disposed on the ground, such that the movable platform travels in a substantially straight path while being moved from the first point to the second point.

In yet another aspect of the invention, a system for moving heavy objects about a manufacturing yard is provided. In one embodiment, the system can include a pair of rails disposed on the ground of the manufacturing yard; a plurality of multi-ton rollers configured to mate with the rails, each multi-ton roller configured to be attached to a movable platform which is configured to accept a packed column section; and a winch disposed between the pair of rails and secured to the ground of the manufacturing yard, the winch having a spool of cable with one end configured to be attached to the movable platform, the winch configured to apply a force to cause the movable platform to travel about a length of the pair of rails.

In optional aspects of the system for moving heavy objects about the manufacturing yard:
- each multi-ton roller can also include a body frame extending along a longitudinal axis; a top plate secured to the body frame, the top plate configured to attach to the movable platform; and a plurality of individual rollers movable about a load-bearing member and located within the body frame, the plurality of individual rollers configured to support the body frame and facilitate longitudinal movement of the body frame along the length of the rail;
- each multi-ton roller can also include a set of guides that are configured to prevent side to side movement of the multi-ton roller when the multi-ton roller is mated with the rail;
- wherein the pair of rails protrude above the ground;
- wherein the pair of rails are sunk into the ground such that the head of the rail does not protrude above the surface of the ground;
- the system can also include a movable platform for moving a packed column section about a remote manufacturing yard, the packed column section comprising a first course, a second course, packing disposed within the first course and second course, and a distributor, the movable platform configured to support and distribute the weight of the packed column section, the movable platform comprising a base frame, table posts, and a movable beam, wherein the movable beam and table posts are configured to be movable about the base frame, such that the movable platform can accommodate packed column sections of varying diameters;
- the table posts are configured to mate with slots of a support base to provide an increase in stability;
- the table posts extend upward from the base frame and are configured to elevate the support base off the ground, thereby giving a user access to an underside of the packed column section; and/or
- the support base can also include an opening that is configured to give a user access to an underside of a packed column section when the packed column section is on top of the support base.

In yet another aspect of the invention, a system for distributing the weight of a column section during lifting by a crane is provided. In one embodiment, the system can include a roundness ring disposed about an outer circumference of the column section, the roundness ring configured to provide support to the column section such that the column section maintains a substantially cylindrical shape during movement of the column section; a plurality of shims configured to be wedged between the roundness ring and the outer circumference of the column section to improve the fit between the roundness ring and the column section; and a plurality of lifting lugs, wherein the lifting lug is configured to receive a lifting force from the crane and transfer this lifting force to the roundness ring.

In optional aspects of the system for distributing the weight of the column section during lifting by the crane:
- the system for distributing the weight of the column section can also include a plurality of reinforcement pads, wherein each reinforcement pad is attached to the outer surface of the column section, wherein at least a portion of the lifting lug is attached to the reinforcement pad;
- the reinforcement pad is configured to prevent shearing of the column section during lifting;
- the reinforcement pad is attached to the column section by welding;
- the reinforcement pad is disposed above and below the roundness ring;
- the reinforcement pad is disposed only below the roundness ring;
- each lifting lug is attached to the roundness ring;
- the roundness ring is configured to be dismantled, such that the roundness ring can be removed from the column section and reused for a second column section;
- the roundness ring is comprised of multiple segments bolted together;
- the shims are generally L-shaped;
- the shims are configured to have different widths such that the shims are adapted for different shell thicknesses;
- each lifting lug can include an opening that is configured to receive the lifting force from the crane;
- each lifting lug is bolted to the roundness ring;
- the plurality of lifting lugs are spaced evenly about the roundness ring;
- each lifting lug can also include a top body and a bottom body, the top body configured to be disposed above the roundness ring, the bottom body configured to be disposed below the roundness ring, wherein the lifting lug is configured to be secured to the roundness ring by bolting the top body to the bottom body;
- the top body of the lifting lug is configured to be removed from the roundness ring without removal of the bottom body;
- the system for distributing the weight of the column section can also include an upper portion extending from the top body of the lifting lug, the upper portion having a substantially semi-circular shape at the top, the upper portion having a reinforced opening configured to receive the lifting force from the crane; and/or
- the reinforced opening is configured to be operably connected with a Crosby shackle.

In yet another aspect of the invention, a hanging platform assembly for use in accessing a column section is provided. In one embodiment, the hanging platform assembly can include a walkway configured to allow a user to walk about the hanging platform; a backing extending vertically from the walkway at a point distal from the stacked column; an angled post extending at an angle down and away from the walkway; a foot pad disposed on the end of the angle post, the foot pad configured to rest against the outer surface of the stacked column; a vertical post connected the walkway and the angled post; and an adapter disposed on the walkway at a point proximal the outer surface of the stacked column, wherein the adapter is configured to mate with a clip attached to the column section, such that when a downward force is applied to the walkway, the clip is configured to prevent the walkway from falling to the ground.

In optional aspects of the hanging platform assembly:
the clip is generally v-shaped;
the clip is welded onto the stacked column;
the hanging platform assembly can also include a backing strip attached to the outer surface of the column section, wherein the clip is welded onto the backing strip;
the hanging platform assembly can also include a clip pad attached to the outer surface of the column section, wherein the clip is welded onto the clip pad;
the foot pad is configured to disperse the weight of the hanging platform against the stacked column;
the hanging platform assembly can also include a vertical extension extending from the backing, the vertical extension having a plurality of arms extending outwards from the top of the vertical extension, wherein the plurality of arms are configured to support an external weather shelter as described herein;
the plurality of arms are substantially parallel with an outer edge of the walkway;
the hanging platform assembly is configured to support the weight of a user without any portion of the hanging platform touching the ground;
the hanging platform assembly can also include handrails connected to the backing;
the handrails are configured to be adjustable in length, such that the platform can adjust for column sections having varying diameters; and/or
the handrails are telescopic.

In yet another aspect of the invention, a method for accessing a stacked column using any hanging platform assembly as described herein is provided. In one embodiment, the method can include the steps of attaching a set of the clips to the stacked column; and installing the hanging platform assembly to the stacked column by inserting the adapter into a gap formed between the clip and the stacked column.

In yet another aspect of the invention, a method of installing a vaporizer in a remote manufacturing yard is provided. In one embodiment, the method can include the steps of obtaining a lower stage and an upper stage of a vaporizer; obtaining a first column section and a second column section; installing the lower stage to a bottom head such that the lower stage is in fluid communication with an inner volume of the bottom head; installing the first column section over and around the lower stage and fitting and welding a bottom of the first column section to the bottom head; installing the upper stage; and installing the second column section and fitting and welding a bottom of the second course to the first course.

In optional aspects of the method of installing the vaporizer in the remote manufacturing yard:
the step of obtaining a first column section further can include the steps of: (a) obtaining a first plate; (b) rolling the first plate using a vertical plate roller such that the first plate is vertically rolled to create a first partial shell; (c) moving the first partial shell to an assembly table that is configured to support two or more partial shells simultaneously; (d) obtaining a second plate; (e) rolling the second plate using the vertical plate roller such that the second plate is vertically rolled to create a second partial shell; (f) moving the second partial shell to the assembly table that is configured to support two or more partial shells simultaneously; and (g) arranging the first partial shell with the second partial shell and welding the first partial shell to the second partial shell using a first weld machine to form the first course.
the step of obtaining a second column section can also include repeating steps (a)-(g);
the vaporizer was previously manufactured and assembled in a main facility away from the remote manufacturing yard;
the step of obtaining a lower stage and an upper stage of a vaporizer can also include the steps of manufacturing a fully assembled vaporizer in a facility away from the remote manufacturing yard; splitting the fully assembled vaporizer into at least two sections, the at least two sections comprising a lower stage and an upper stage, wherein the lower stage and the upper stage are configured to be transportable via roads; and transporting the at least two sections from a main facility to the remote manufacturing yard;
the lower stage can include a four core assembly;
the upper stage can include a four core assembly;
the step of installing the upper stage can include welding piping interconnections between the upper stage and the bottom head, such that the upper stage is in fluid communication with the inner volume of the bottom head;
a backing strip is used during the step of installing the second column section over and around the lower stage and fitting and welding the bottom of the second column section to the first column section;
the method of installing the vaporizer can also include the step of creating draining holes in the backing strip, wherein the drainage holes are configured to allow liquid that falls between the backing strip and the column section to drain through the drainage holes during operation;
the drainage holes are round;
a backing strip is used during the step of installing the first column section over and around the lower stage and fitting and welding the bottom of the first column section to the bottom head; and/or
the step of obtaining a first column section and a second column section can further include the steps of: forming a plurality of column sections comprising the first column section and the second column section, each column section having a diameter D, each column section comprising a plurality of courses that have been horizontally welded together, wherein each course is comprised of two or more partial shells that have been vertically welded together, wherein each of the two or more partial shells was created by vertically rolling a rectangular plate having a length of at least $$\left(\frac{1}{N}\pi \cdot D\right),$$

wherein N is the number of partial shells used to form the course.

In yet another aspect of the invention, a yard leveling base for leveling a column during assembly is provided. In one embodiment, the yard leveling base is configured to allow for a packed column section of a column to be placed on a top surface of the yard leveling base, the yard leveling base can further include a bottom surface configured to maintain substantial contact with the ground of a remote manufacturing yard, wherein the yard leveling base is adapted to adjust the level of the top surface of the yard leveling base to account for unevenness or slope of the ground of the remote manufacturing yard.

In optional aspects of the yard leveling base:
the bottom surface can include a plurality of notches disposed therein, wherein each notch is configured to allow access for a lifting system to the notch such that the lifting system can raise an area of the top surface of the yard leveling base directly above the notch;
the lifting system is selected from the group consisting of a hydraulic lift, a screw lift, an air lift, and combinations thereof;
the yard leveling base can also include a plurality of notches at its bottom that are configured to receive a lifting system to be placed within the notches and raise the level of the yard leveling base at the notch;
the lifting system is selected from the group consisting of a hydraulic lift, a screw lift, an air lift, and combinations thereof;
the yard leveling base can include a washer-like shape;
the yard leveling base can include a nut-like shape;
the yard leveling base can also include an inner diameter, an outer diameter, and a height;
the yard leveling base is secured to the floor, preferably using a clamp system;
the yard leveling base is configured to accommodate a weight of 100 metric tons; and/or
the yard leveling base can also include centering guides disposed on the top surface of the yard leveling base, the centering guides configured to center the packed column on top of the yard leveling base.

In yet another aspect of the invention, a method for leveling a column during assembly in a remote manufacturing yard is provided. In one embodiment, the method can include the steps of installing a yard leveling base as claimed in Claim 194 on the ground of the remote manufacturing yard; measuring the levelness of a top surface of the yard leveling base; adjusting the yard leveling base until the top surface of the yard leveling base is substantially level; and placing a packed column section of a column onto a top surface of the yard leveling base.

In optional aspects of the method for leveling the column during assembly in the remote manufacturing yard:
the method for leveling the column can also include the step of securing the yard leveling base to the ground, preferably using a clamp system, more preferably using anchor bolts;
the bottom surface of the yard leveling base can include a plurality of notches disposed therein, wherein the notches are configured to allow a lifting system access to the notch such that the lifting system can raise a portion of the top surface of the yard leveling base;
the step of adjusting the yard leveling base can also include the steps of inserting a lifting system into the notch located under a portion of the top surface needing adjustment; and activating the lifting system to cause the top surface to raise;
the yard leveling base can have a washer-like shape;
the yard leveling base can have a nut-like shape;
the yard leveling base can have an inner diameter, an outer diameter, and a height;
the method for leveling the column can also include the step of adjusting the yard leveling base after the step of placing a packed column section of a column onto the top surface of the yard leveling base;
a plumb line system is used to measure the levelness of the yard leveling base during the step of adjusting the yard leveling base after the step of placing a packed column section of a column onto the top surface of the yard leveling base; and/or
adjusting the yard leveling base can also include the steps of raising a portion of the yard leveling base with a lifting system and putting a shim underneath the yard leveling base.

In yet another aspect of the invention, a method for installing packing in a remote manufacturing yard is provided. In one embodiment, the method can include the steps of manufacturing structured packing in a facility away from the remote manufacturing yard; splitting a level of the structured packing into a plurality of sections and then placing each section into a separate box for transport, wherein each box can include an inner profile configured to match its section of packing so as to reduce damage to the packing during transport; transporting the box to the remote manufacturing yard; and installing the packing into a column section.

In optional aspects of the method for installing the packing in the remote manufacturing yard:
if the length of a strip of structured packing exceeds a threshold length, the strip of structured packing is placed into a box having a length that is less than the threshold length, such that the strip of structured packing forms a wave-like shape within the box, thereby reducing the apparent length of the strip of structured packing;
the inner profile of the box matches the wave-like shape of the strip of structured packing;
the inner profile of the box matches a profile of the circumference of the column section the structured packing is installed;
each box is configured to fit inside the column section at any angle;
the length of each box is less than the diameter of the column section;
the step of installing the packing into the column section can also include the steps of removing the structured packing of each box for a level of structured packing; organizing said structured packing on a working table to form a packing assembly; and installing a perimeter band around the perimeter of the packing assembly, wherein the perimeter band is configured to hold the packing assembly together in a substantially circular shape during installation of the packing into the column section;
the perimeter band can also include a seal that is configured to direct fluid flowing along the inner wall of the column section toward the packing while the column section is in operation;
the step of installing the packing into the column section can also include the steps of: a) introducing the box into the inner area of the column section; and b) removing the structured packing from the box and installing said structured packing into the column section; and c) repeating steps a) to b) to form the packed column section; and/or
each section includes individual packing strips, wherein the step of splitting the level of the structured packing into a plurality of sections and then placing each section into a separate box for transport further includes the step of arranging the individual packing strips in the box in an alternating fashion by flipping every other packing strip such that the profiles of successive packing strips match, thereby resulting in a lowered packed height.

In yet another aspect of the invention, a weather shelter for providing protection during assembly of a column at a remote manufacturing yard is provided. In one embodiment, the weather shelter can include a frame mounted to a hanging platform, and extending upwards from the hanging platform, the hanging platform supported by the column; and a protective covering mounted on the frame having a side covering and a top covering, the protective covering configured to provide an inner atmosphere within the protective covering protected from external elements when the protective covering is secured to the column.

In optional aspects of the weather shelter:
the frame can also include vertical posts extending upwards from a backing of the hanging platform;
an upper portion of the top covering is configured to secure to the column and a lower portion of the top covering is configured to secure to the frame;
the top covering can also include a plurality of upper loops configured to receive an upper strap, wherein the upper strap is configured to secure the top covering to the column when the upper strap is tightened;
the top covering can also include a plurality of lower loops configured to receive a lower strap, wherein the lower strap is configured to secure the top covering to the frame when the lower strap is tightened;
an upper portion of the side covering is configured to secure to an upper portion of the frame and a lower portion of the side covering is configured to secure to the column;
an upper portion of the side covering can also include a plurality of upper side loops configured to receive an upper side strap, wherein the upper side strap is configured to secure the upper portion of the side covering to the frame when the upper side strap is tightened;
a lower portion of the side covering can also include a plurality of lower side loops configured to receive a lower side strap, wherein the lower side strap is configured to secure the lower portion of the side covering to the column when the lower side strap is tightened;
a bottom portion of the top covering surrounds an upper portion of the side covering, such that when the bottom portion of the top covering is secured to the frame, the upper portion of the side covering is secured to the frame;
the side covering can also include hanging straps disposed on an upper portion of the side covering, the hanging straps configured to attach to side arms of the frame, such that the hanging straps provide support for the side covering;
the weather shelter can also include an access door disposed on the wall paneling, the access door configured to provide access to the inner atmosphere within the protective covering for a user;
the side covering can also include a plurality of door loops configured to receive a door strap, wherein the door strap is configured to secure a portion of the side covering above the access door to the frame or the hanging platform when the door strap is tightened;
the side covering can include a plurality of wall sections attached together to form the side covering;
the side covering can also include zippers attached to the ends of the wall sections, the zippers configured to attach the plurality of wall sections together;
the top covering can include a plurality of top covering sections attached together to form the top covering;
the top covering can also include zippers attached to the ends of the top covering sections, the zippers configured to attach the plurality of top covering sections together;
the top covering can include a plumb line access configured to provide access for a plumb line while maintaining the inner atmosphere within the weather shelter;
the frame is collapsible; and/or
the inner atmosphere of the protective covering is adapted to receive a portable heater or air conditioning.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

FIG. 15 shows an embodiment of the invention.
FIG. 16 shows an embodiment of the invention.
FIG. 18 shows an embodiment of the invention.
FIG. 19 shows an embodiment of the invention.
FIG. 20 shows an embodiment of the invention.
FIG. 21 shows an embodiment of the invention.
FIG. 22 shows an embodiment of the invention.
FIG. 30 shows an embodiment of the invention.
FIG. 32 shows an embodiment of the invention.
FIG. 34A and FIG. 34B show an embodiment of the invention.
FIG. 35A and FIG. 35B show an embodiment of the invention.

DETAILED DESCRIPTION

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

In certain embodiments, the primary drivers for determining which components of the ASU could be made remotely can include remote fabrication by inexperienced craft, the transport costs exposure and all the risks associated with manufacturing in a harsh environment.

In one embodiment, the method and device can be altered or tailored to an individual user's need. For example, the method can include identifying a user's requirements for land surface, building sizes, equipment/tooling and utilities which in turn will determine the design and construction requirements, percentage or ratio of the actual overall columns and vessels fabrication, schedule and cost. Each of these Modules can be added, combined, or deleted to be adapted to any proposal, strategies and or combined with any Entity Manufacturing load.

In one embodiment, the Remote Manufacturing Yard ("RMY") is a mobile solution for manufacturing of columns that can be used on individual projects, when needed. The use of the RMY is not applicable for all projects. For example, the use of the RMY will depend on a certain number of factors, a few non-limiting factors could include:
Site location;
Transportation limitations due to infrastructure capacity (most often bridge capacities or clearances) or limited waterway access;
Economical consideration between transportation and manufacturing on site;
Land and utilities availability locally;
Local labor availability and cost; and
Project capacity, number and size of column sets;

In one embodiment, the method for fabrication can include various packing installations methods. For example, the packing sheets can be (1) inserted directly inside the column shells at the RMY, (2) packaged in segments of 150 mm height and inserted directly inside the column shells at the RMY, and/or (3) manufactured in blocks ("Frittes") and inserted directly inside the column shells at the RMY.

In another embodiment, a vertical plate rolling machine can be used for rolling the shells; however, due to size limitations, the method preferably includes rolling shells in segments using flux-cored arc welding (FCAW) in a vertical position for the longitudinal welds. Shell circumferential welding can also be accomplished using FCAW process in a horizontal position. This advantageously minimizes joint deformation versus a complete GTAW process and increases overall productivity.

In one embodiment, two stage cores and piping headers for the vaporizer and exchanger will be prefit and supplied in preassemblies using conventional transport, while the shells and heads will be fabricated and assembled at the RMY.

Figure 1:
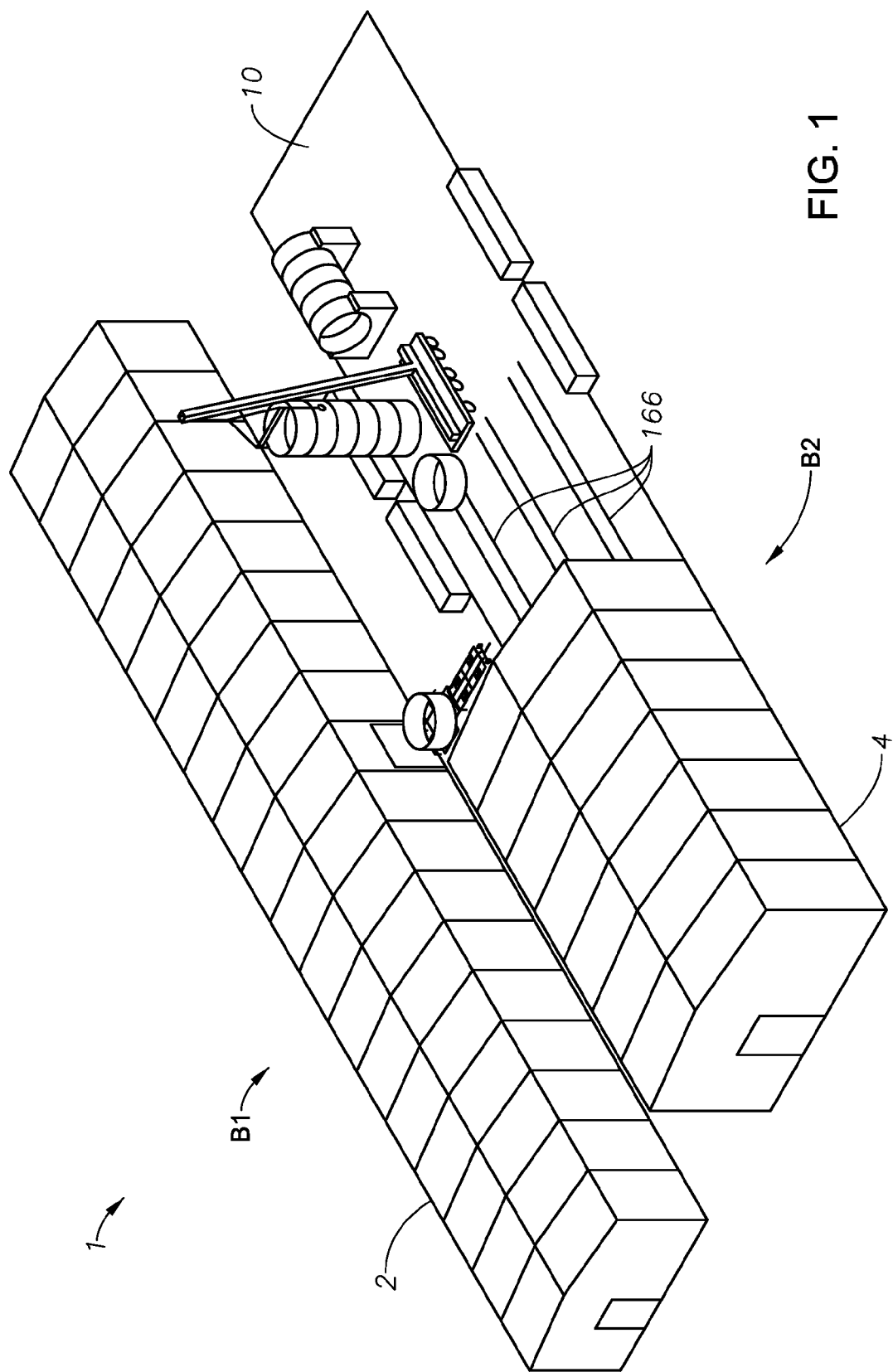
FIG. 1 shows an embodiment of the invention.
Figure 2:
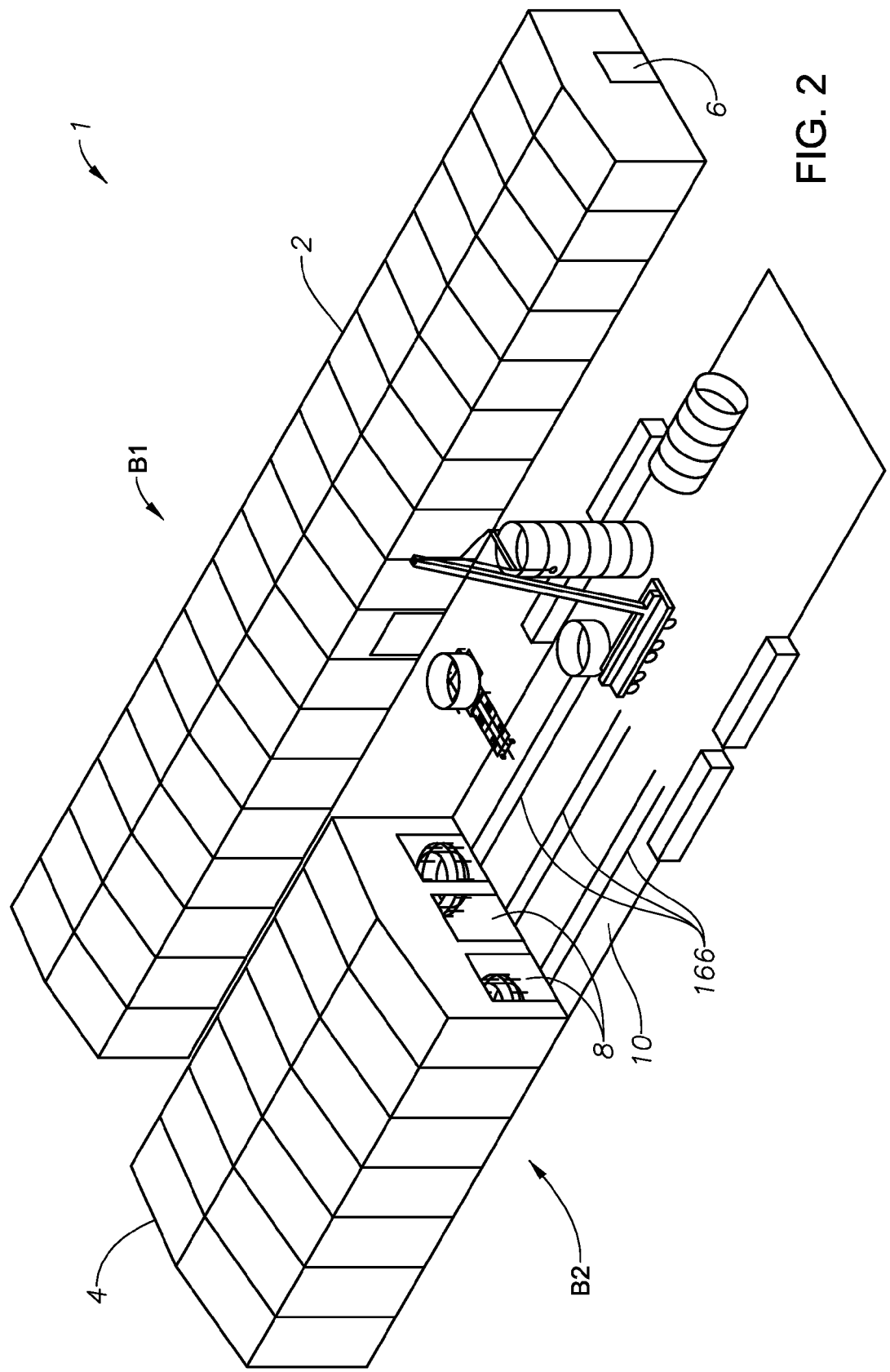
FIG. 2 shows an embodiment of the invention.

FIG. 1 represents a perspective view of remote manufacturing facility 1. In the embodiment shown, remote manufacturing facility 1 includes building one B1 and building two B2 as separate structures; however, those of ordinary skill in the art will readily recognize that the invention is not so limited. In this embodiment, remote manufacturing facility 1 includes first structure 2, second structure 4 and outdoor yard 10. FIG. 2 provides another perspective view of remote manufacturing facility 1, which shows various access doors 6, 8 to B1 and B2, respectively.

Figure 3:
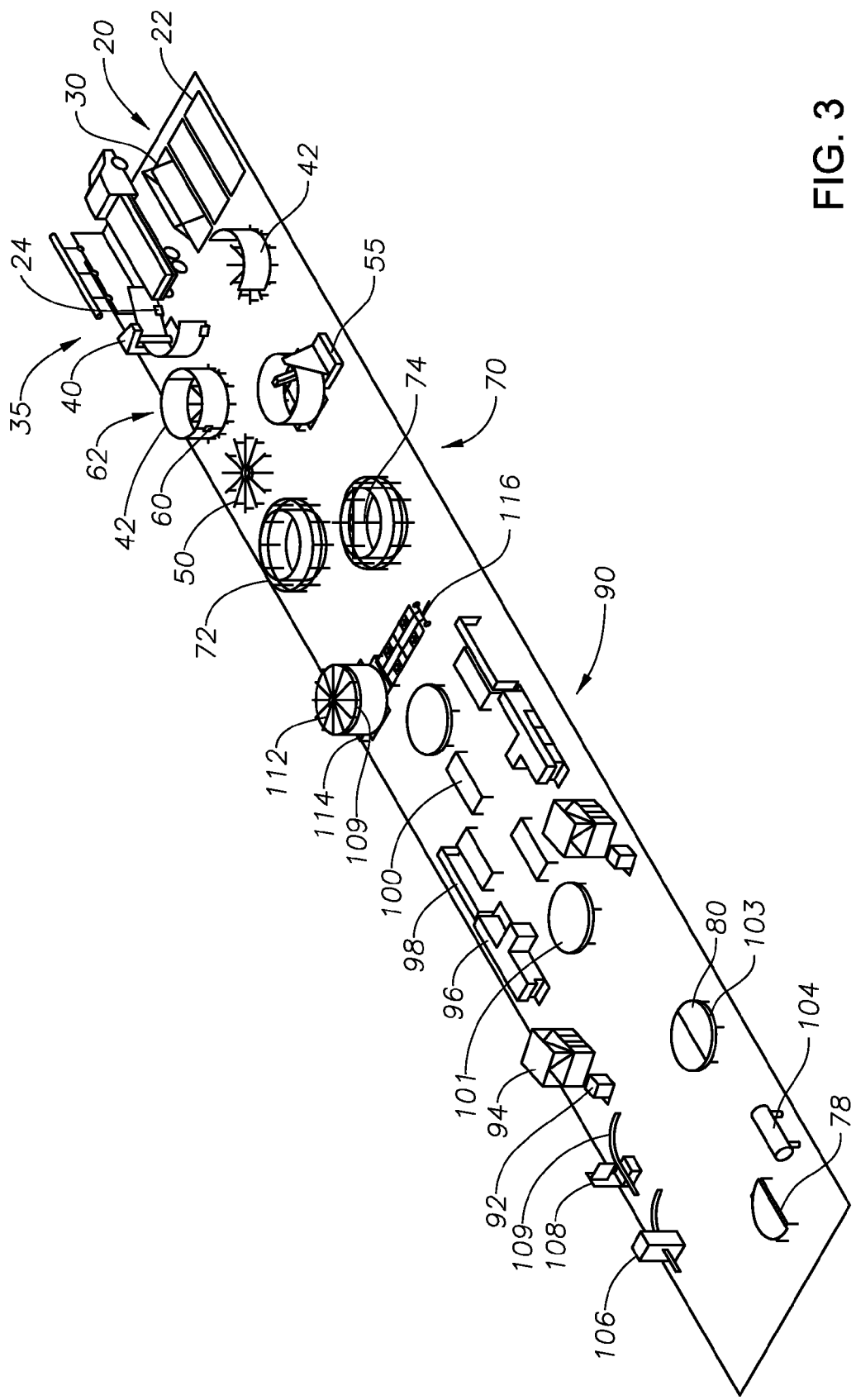
FIG. 3 shows an embodiment of the invention.

FIG. 3 provides a wide perspective view of building one B1 without first structure 2 so as to provide a view of the internal stations within building one B1. Starting from the right side, a delivery truck can be used to deliver plate 22 to building one B1. Each plate 22 is generally rectangular in shape and can have lengths of about 6 to about 12 meters, thicknesses of about 6 to about 22 millimeters and heights of about 0.5 to about 2.5 meters. In one embodiment, plate 22 is made from stainless steel material, preferably A240, TP 304/304L or aluminum, preferably aluminum 5083. After receiving plate 22, plate 22 is moved to plate storage area 20 for storage until needed. Once plate 22 is needed, it can then be moved to plate rolling area 35 via plate lifting device 30 to prep for rolling. Once plate 22 is vertically situated properly on trolley 24, plate 22 is fed through vertical roller 40 in order to roll plate 22 in a vertical orientation so as to impart a curve and to form half course 42. This process is repeated with another plate 22 to create another half course 42.

The two half courses 42 are then placed on assembly table 50 and mated and welded together using vertical welder 60 to form full course 62. In one embodiment, the welding is done from both the inside and the outside. In an optional embodiment, full course 62 can be moved to forming device 55 in order to improve the curvature of full course 62, particularly at the weld locations.

After forming, full course 62 can then be moved to dressing area 70. In this area, many items can be installed within and on full course 62 (to be discussed infra). Scaffolding 72 is erected in and around full course 62 to assist, in conjunction with course lifting device 74, with installation of the various items within and on full course 62.

Now turning to the left side of FIG. 3, distributor reception table 78 receives and stores at least one half of distributor 80. Two halves are moved onto working table 102 and mated together to form one distributor 80. The embodiment shown in FIG. 3 also includes packing fabrication area 90 for creating packing onsite. In this embodiment, packing fabrication area 90 includes coil holder 92, press module skid 94, washing and cutting skid 96, reception table 98, and transfer table 100. Coil holder 92 feeds continuous metal strips (preferably aluminum) into press module skid 94 in order to create corrugated packing. From there, the corrugated packing moves to washing and cutting skid 96 to remove oils and other impurities from the corrugated packing, as well as to cut the corrugated packing into its appropriate strip length. After cutting, the individual packing strips move to reception table 98 where the strips are organized and grouped together before using transfer table 100 to transfer the grouped strips to working table 102 where they are then put together to form a complete pack.

Bender machine 106 and cutting machine 108 help to create packing band 109, which is placed circumferentially around the complete pack in order to form a complete pack assembly. In certain embodiments, packing band 109 includes an adapter that is configured to be picked up by packing lifting device 112. Once the appropriate levels of packing are stacked, packing lifting device 112 moves the packing to packing pallet 114, so that the packing may be moved to building two B2 for installation within the column section. In the embodiment shown, trailer 116 slides underneath packing pallet 114 and then raises packing pallet 114 off the ground, such that trailer 116 provides full support of the packing. Trailer 116 is then moved to building two B2 via forklift or other appropriate machine.

Figure 4:
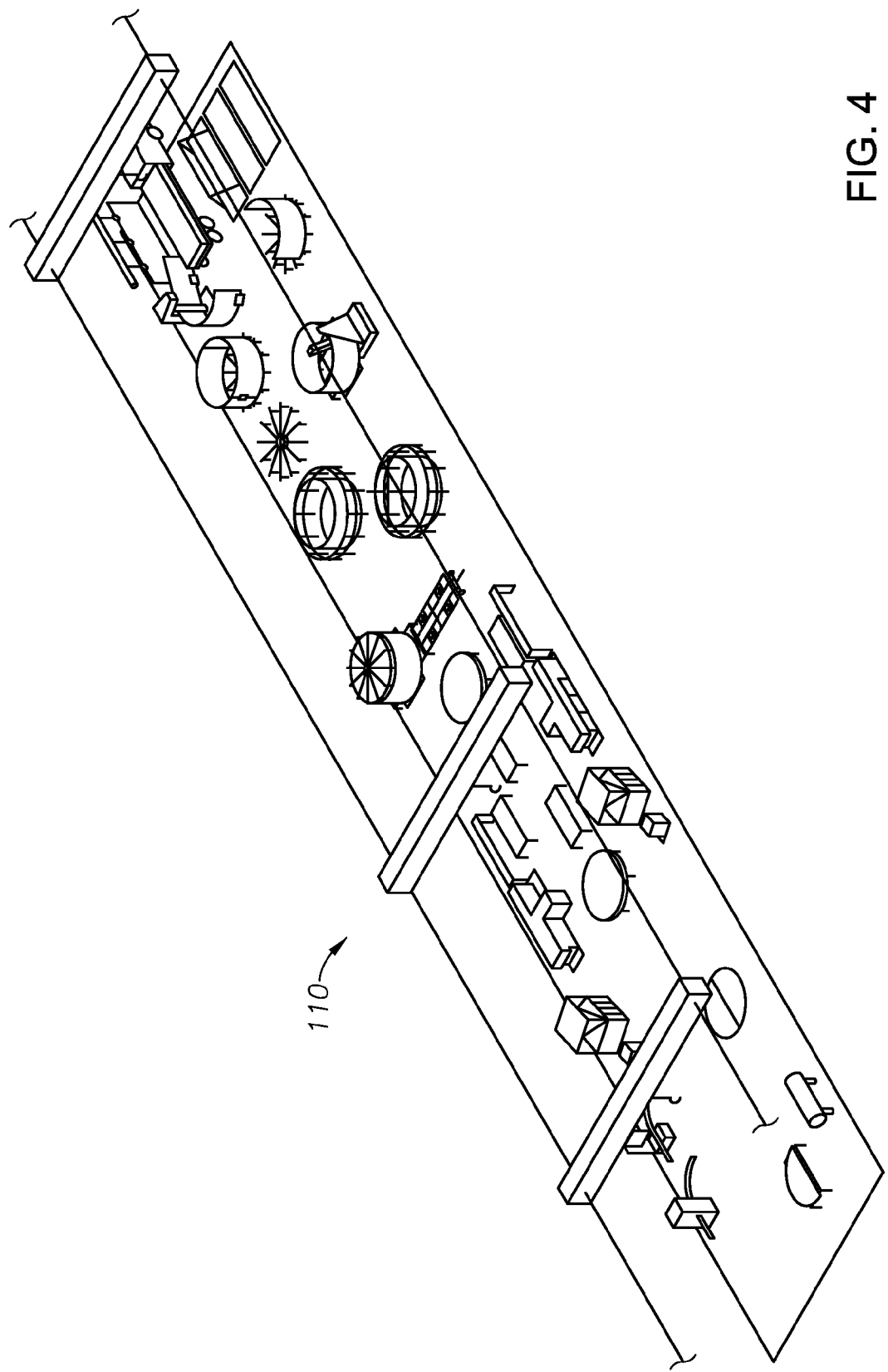
FIG. 4 shows an embodiment of the invention.

FIG. 4 provides a view of an embodiment which includes a plurality of overhead cranes 110. In this embodiment, each overhead crane 110 can traverse a certain point of building one B1; such that the combined effect of all overhead cranes 110 is that the entire length of building one B1 is covered, thereby allowing for various items and pieces of equipment to be moved throughout building one B1. Additionally, FIG. 4 also depicts movement of the packing from building one B1 using packing pallet 114 and trailer 116.

Figure 5:
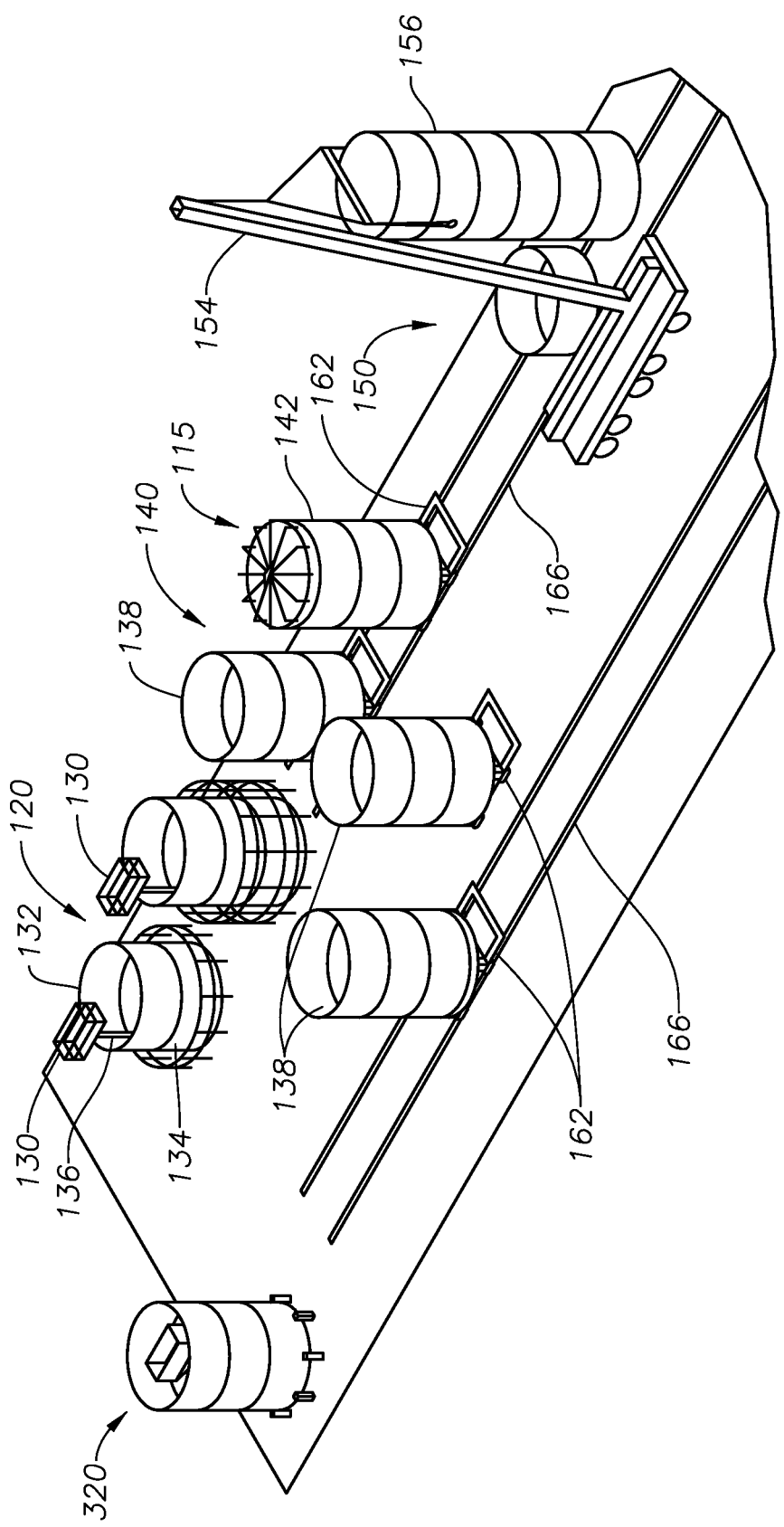
FIG. 5 shows an embodiment of the invention.

FIG. 5 provides a wide perspective view of building two B2 without second structure 4 so as to provide a view of the internal stations within building two B2. Starting from the left side, second course 132 is brought to column section assembly area 120 and welded to the top of first course 134 using horizontal welder 130 to form column section 138. In another embodiment, a third course can also be added if desired.

In an optional embodiment, column section 138 can then be subjected to non-destructive testing (not shown) to ensure integrity of the sections. In another optional embodiment, the inner surface of column section 138 can be washed 139 to remove oil and other impurities.

Column section 138 is then lifted and placed on moving platform 162, which can be a multi-ton roller platform. Column section 138 is then moved to packing and distributor installation area 140, wherein the distributors and packing from building one B1 are then lifted and installed within column section 138 to create packed column section 142. Once the packing and distributor(s) are installed, packed column section 142 is then moved from building two B2 to column assembly area 150 in outside yard 10. Those of ordinary skill in the art will recognize that packing and distributor installation area 140 can be in one area or there could be a separate area to install distributors and another separate area to install packing. The term packing and distributor installation area is intended to cover both alternatives.

Once outside, crane 154 is configured to stack a plurality of packed column sections on top of each other so they can be welded together to form column 156. In the embodiment shown, column 156 can be then moved to a horizontal position, prepped for transport, and then loaded on a truck to be delivered to the final installation area, which is preferably close in distance.

Figure 6:
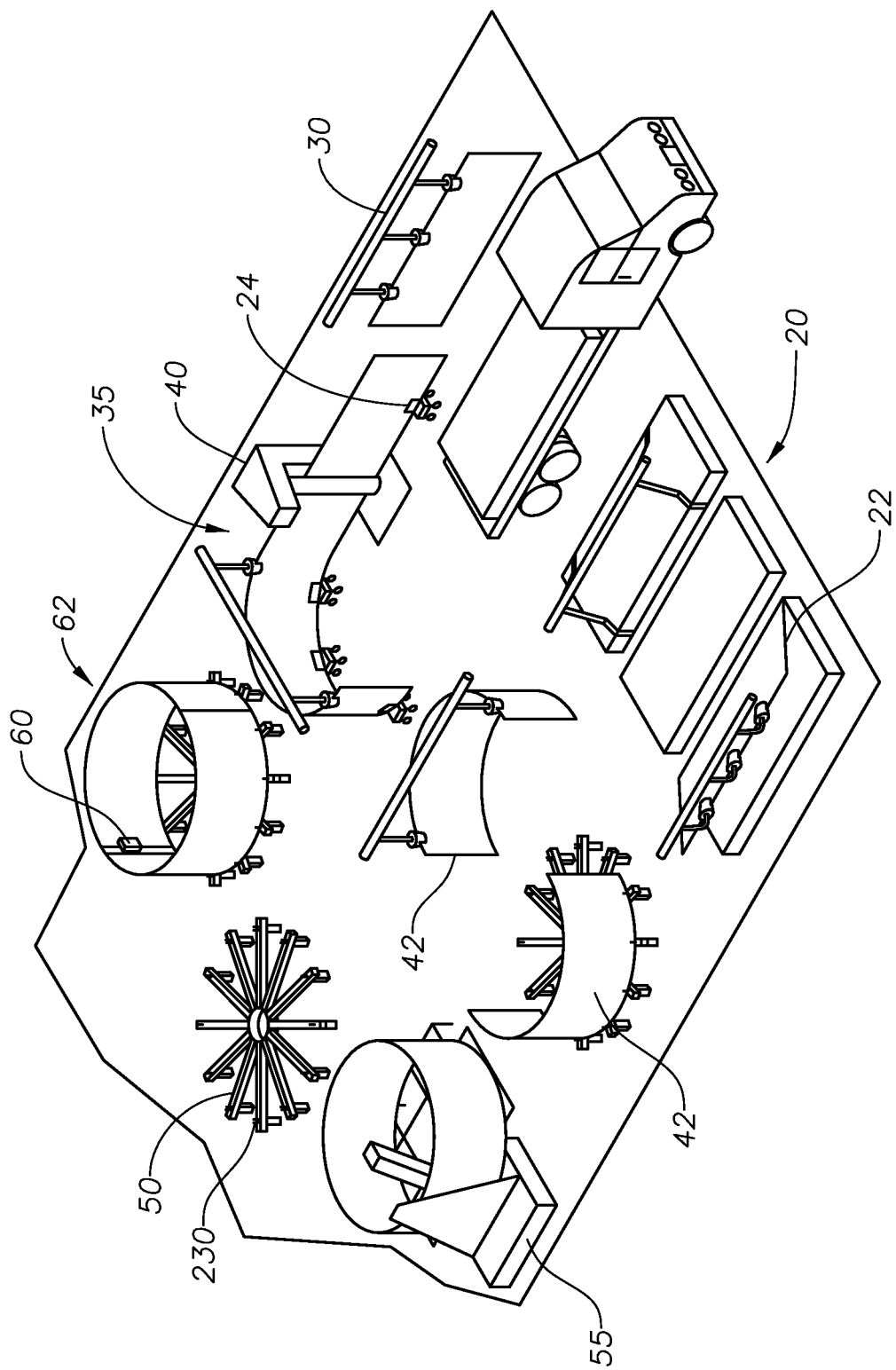
FIG. 6 shows an embodiment of the invention.

FIG. 6 provides another perspective view of the storage and loading area, as well as the vertical rolling and vertical welding. As shown, plates 22 are removed from the delivery truck and placed in plate storage area 20. When a plate is ready to be rolled, plate 22 is lifted from plate storage area 20 by plate lifting device 30 and moved to plate rolling area 35. Plate 22 is then placed on two or more trolleys 24 before being fed through vertical roller 40 to impart the curvature to form half course 42. Half course 42 is then placed on assembly table 50, mated with second half course 42, and then vertically welded together to form full course 62. In one embodiment, mating can include fitting and tack welding. While the embodiments specifically discussed in references to the figures reference a half course, those of ordinary skill in the art will recognize that to create a full course, a plurality of partial courses can be made and then fitted, tacked and welded together to form a full course. As such, any mention of "half" course or "half shell" is not intended to be limited to only splitting the course into two partial shells. Rather, the scope of the current invention is intended to include the making of, and then welding together, as many partial shells/courses to form a full course.

Figure 7:
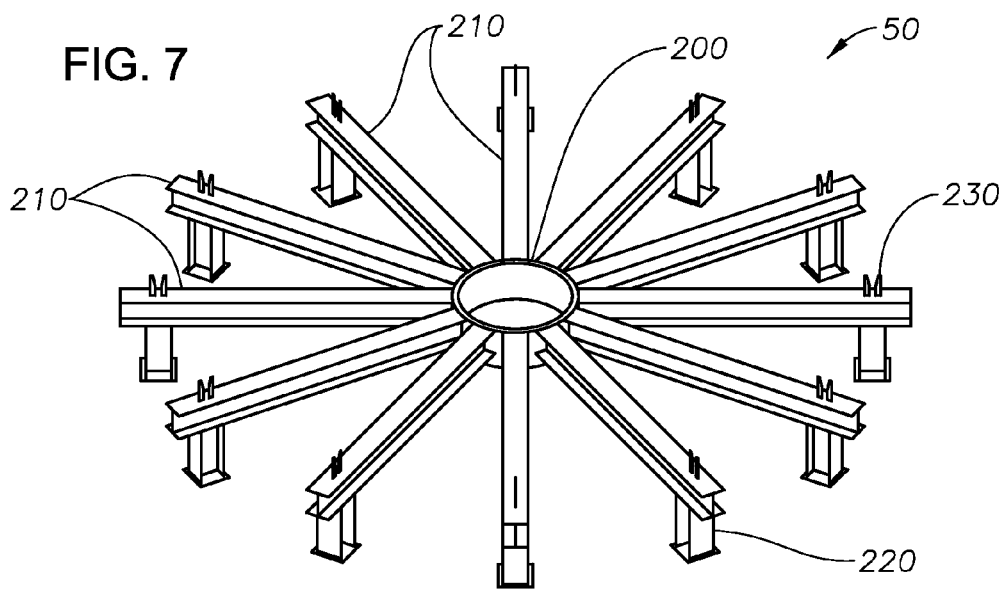
FIG. 7 shows an embodiment of the invention.

FIG. 7 provides a perspective view of assembly table 50. In the embodiment shown, assembly table 50 includes central support base 200, a plurality of arms 210, second support member 220 and centering guide 230. When installed, each arm 210 is attached to central support base 200. In the embodiment shown in FIG. 7, arm 210 is generally shaped as an I-beam and is detachably attached to central support base 200 (e.g., remove nuts and bolts). In another embodiment, arms 210 could be pivotally attached to central support base 200, such that when assembly table 50 is ready to be packed up and transported, the distal end of each arm 210 can rotate toward central support base 200 thereby forming a more compact structure and limiting the footprint of assembly table 50 during transportation. In embodiments without the pivot connection, each arm 210 can simply be detached from central support base 200 and transported accordingly. In one embodiment, central support base 200 can be bolted to the floor when in use.

When installed, second support member 220 is attached to a distal end of arms 210 and is configured to raise assembly table 50 off the ground and to provide support for assembly table 50. In one embodiment, second support member 220 is detachably attached to arms 210. In the embodiment shown in FIG. 7, each second support member 220 is generally shaped as an I-beam; however, those of ordinary skill in the art will recognize that other shapes could be acceptable. In another embodiment, second support member 220 could be pivotally attached to arms 210, such that when assembly table 50 is ready to be packed up and transported, second support member 220 can collapse either toward or away from central support base 200 such that second support member 220 is substantially parallel with arms 210, thereby forming a more compact structure and limiting the footprint of assembly table 50 during transportation. In one embodiment, second support member 220 has a fixed length. In another embodiment, second support member 220 has a length that can be extended. In another embodiment, the length of second support member 220 can be augmented to provide leveling on uneven surfaces without having to use a shim.

Centering guide 230 is attached, preferably at a location on arms 210 that is directly above second support member 220, such that the weight of the two partial shells is directly above second support member 220 during welding. In one embodiment, centering guides 230 can be welded to arms 210. In another embodiment, each centering guide 230 can be movably connected to each arm 210, for example slidably), such that centering guide 230 can move about the length of arm 210, thereby accommodating partial shells of varying diameters. In one embodiment, centering guides 230 are made of stainless steel, preferably stainless steel 304 and are configured to have a tapered opening such that each partial shell can be more easily guided into position.

In one embodiment, centering guide 230 can be comprised of two separate pieces, although those of ordinary skill in the art will understand it is not so limited. In one embodiment, the gap formed in the opening is slightly larger than the thickness of the partial shell, such that the centering guide is not in contact with one or both sides of the partial shell. In one embodiment, the partial shell can be locked into place by installing a spacer (e.g., a shim) of a known thickness in between one of the spaces of the centering guide and the partial shell, and then using a second spacer on the opposing side of the partial shell to apply an opposing force to the partial shell, thereby moving the partial shell to the correct location. This allows for the partial shell to be set into a known inner diameter position.

Figure 8:
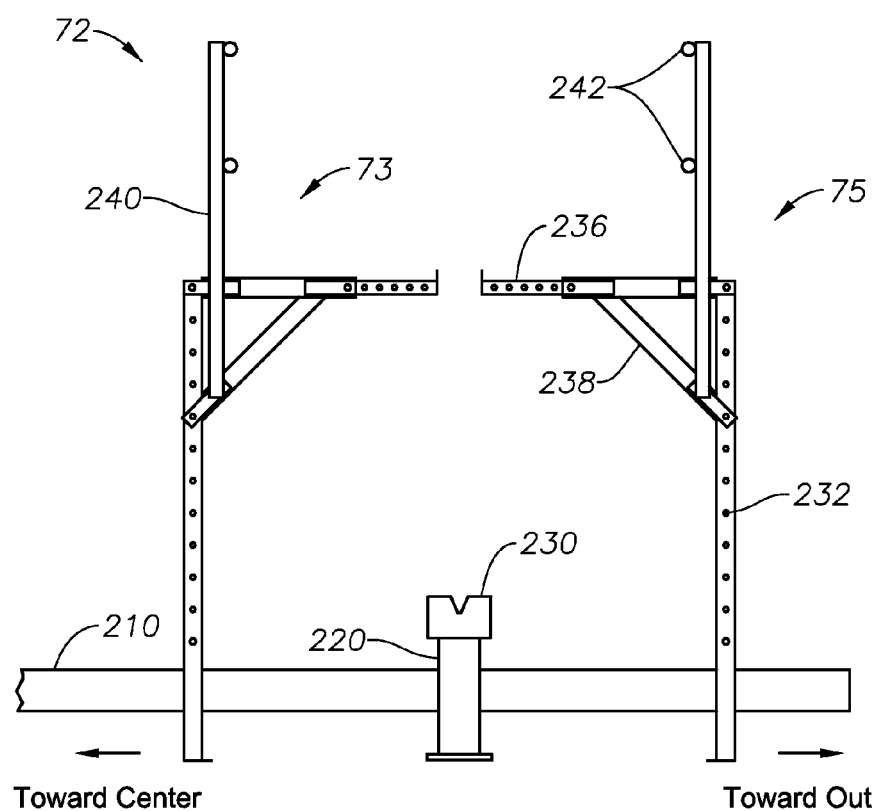
FIG. 8 shows an embodiment of the invention

FIG. 8 depicts a side view of inner scaffolding 73 and outer scaffolding 75 being attached to assembly table 50 with full course 62 removed for ease of view. In this embodiment, main post 232 is connected to second support member 220 via secondary scaffolding support 234. Extendible arm 236 is attached near a top portion of main post 232 and is supported by tertiary scaffolding support 238. Secondary post 240 can be attached to tertiary scaffolding support 238 and extend upwards. Secondary post 240 can have links 242 which are configured to provide support for handrails or other similar safety device. Extendible arm 236 extends towards full course 62 in order to provide support for a walkway (not shown) which lays on top of extendible arm 236, and is configured to support at least one person, thereby giving said person access to both the inner and outer surfaces of full course 62.

In one embodiment, scaffolding 72 can already be erected and attached to assembly table 50 before full course 62 is dropped into place. In one embodiment, extendible arm 236 is in a retracted position before full course 62 is in place to allow for more freedom of movement in getting full course 62 onto assembly table 50. Once full course 62 is in place, extendible arm 236 can be extended and locked into position.

Figure 9:
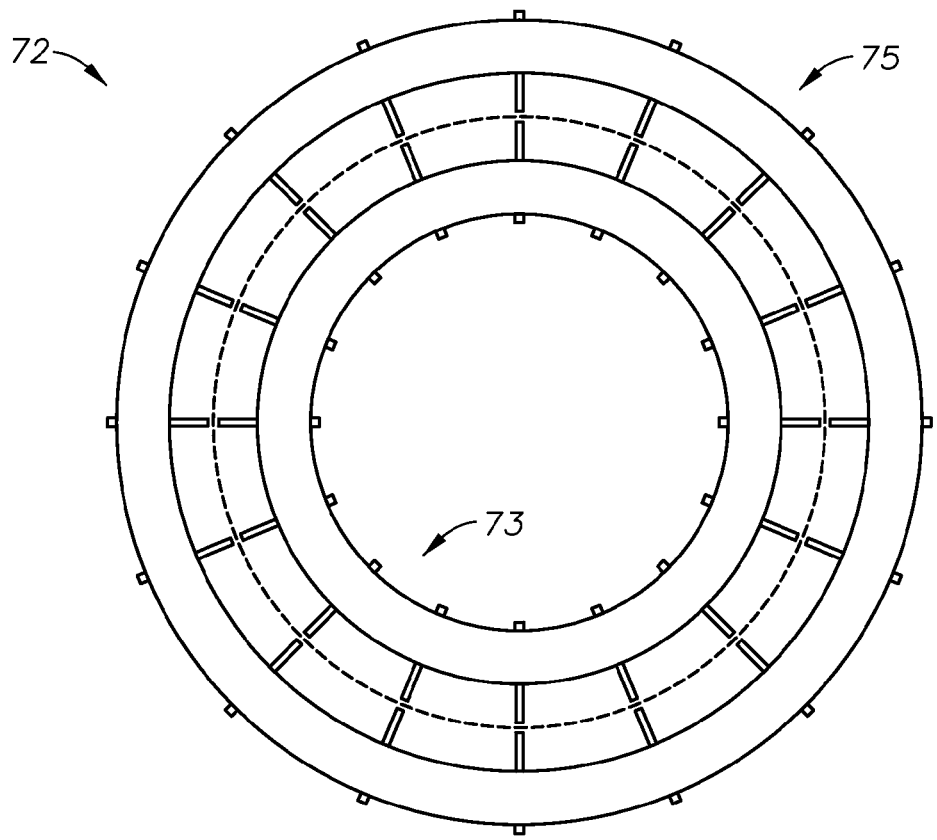
FIG. 9 shows an embodiment of the invention.

FIG. 9 depicts a top view of scaffolding 72. In the embodiment shown, full course 62 is not yet in place and assembly table 50 is not included for clarity. As shown, scaffolding 72 includes outer scaffolding 75 and inner scaffolding 73. In the embodiment shown, full course 62 would be placed roughly half way between outer scaffolding 75 and inner scaffolding 73. Additionally, in the embodiment shown, the space between the outer scaffolding 75 and full course 62 is currently empty. However, a substantial amount of this area will be filled in with temporary outer scaffolding once full course 62 is on assembly table 50 and extendible arm 236 is extended. Similarly, space between the inner scaffolding 73 and full course 62 is currently empty. However, a substantial amount of this area will be filled in with temporary inner scaffolding once full course 62 is on assembly table 50 and extendible arm 236 is extended.

Figure 10:
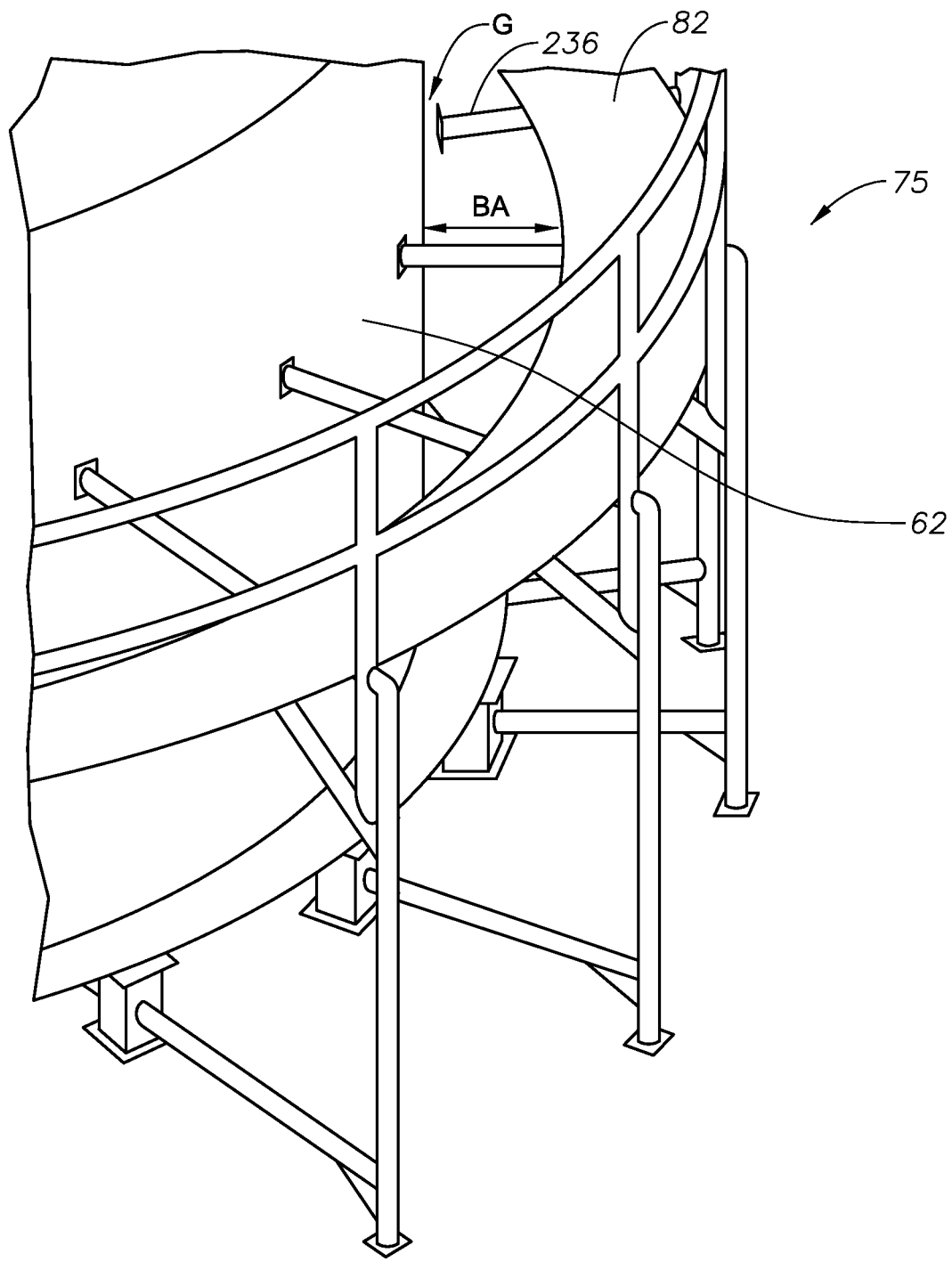
FIG. 10 shows an embodiment of the invention.

FIG. 10 provides a zoomed in perspective view of a portion of full course 62 with outer scaffolding 75. In the embodiment shown, a small gap G will exist between the end of extendible arm 236 when it is extended and full course 62. In a preferred embodiment, the gap is less than two inches. The purpose of the gap is to allow for enough room to move the course in or out of the scaffolding without having to dismantle the entire scaffolding. In the embodiment shown, outer walkway 82 is already in place; however, the temporary outer walkway has not be laid down, which is why there is a blank area BA between full course 62 and outer scaffolding 75. By having this blank area BA, scaffolding 75 can remain in place when the fully dressed full course 62 is moved away from the dressing area (i.e., a shell having roundness ring and lifting lugs installed). In one embodiment, outer walkway 75 can be selected from steel, wood planks, other metallic walkways, or the like.

Figure 11:
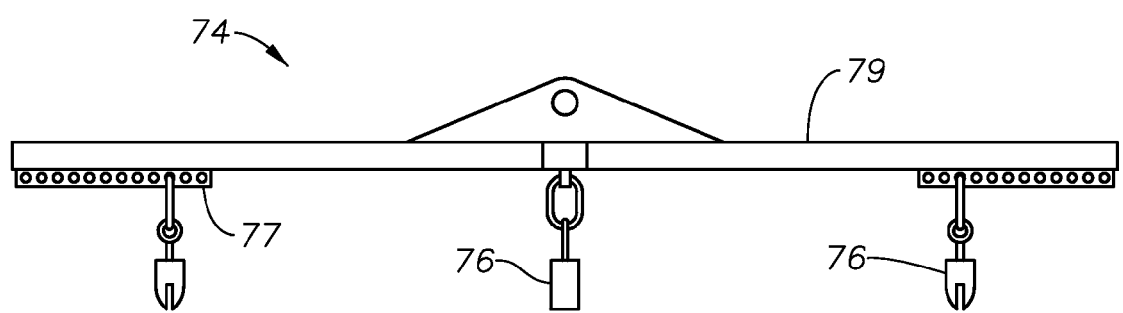
FIG. 11 shows an embodiment of the invention.

FIG. 11 provides a side view of course lifting device 74. In the embodiment shown, course lifting device 74 includes four support arms 79, with each having plate clamp 76 attached thereto. In situations where the user will likely produce shells of differing diameters, course lifting device 74 can include means for diameter adjustment 77. In the embodiment shown, this includes a plate with a plurality of holes disposed about the plate. Plate clamp 76 can be attached to one of the holes by any suitable connection, for example a Crosby shackle, a carabineer, or the like. Various means for adjustment can include a sliding hook, that is configured to slide about the length of the arm and lock into place.

Figure 12:
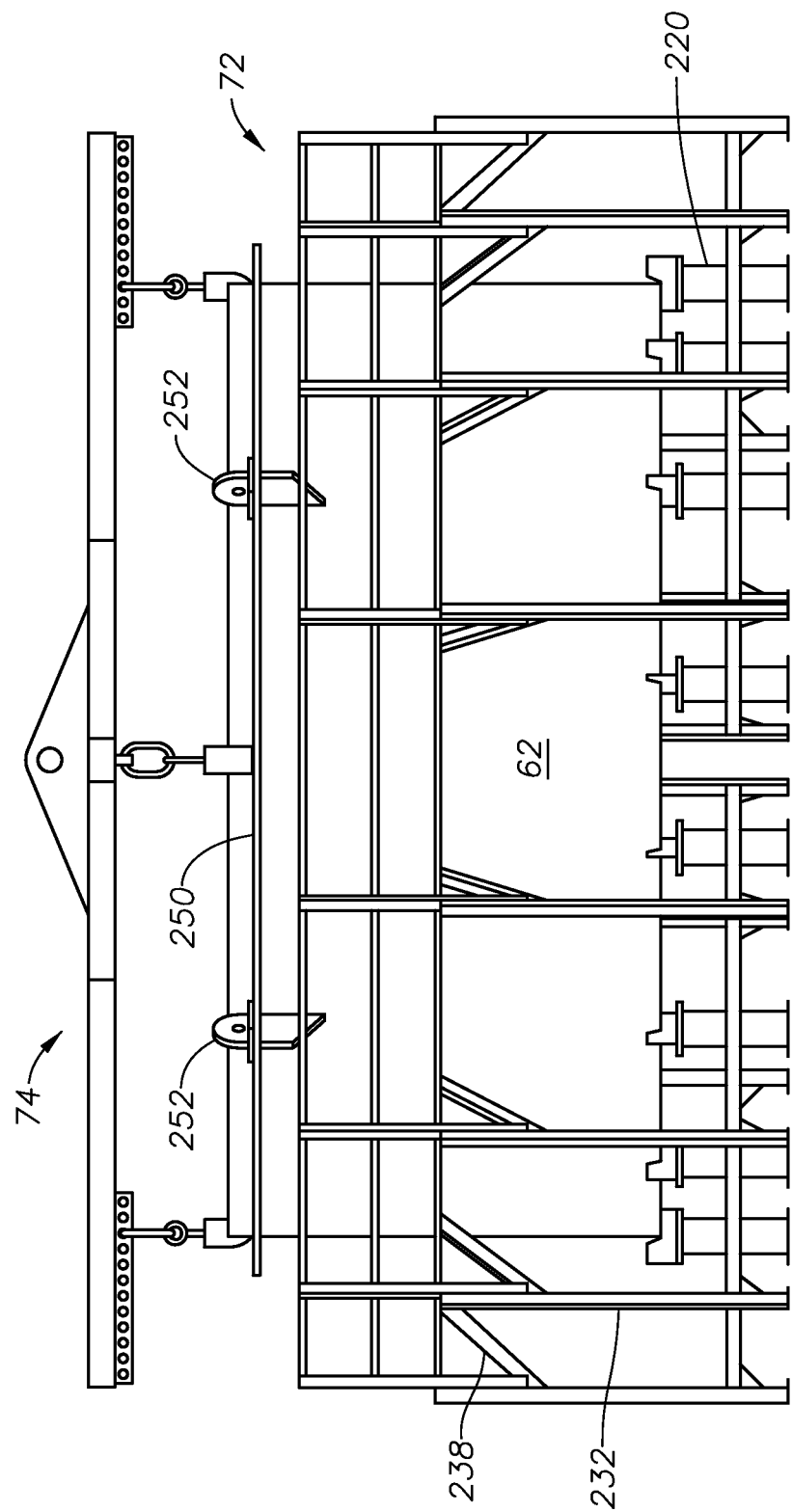
FIG. 12 shows an embodiment of the invention.

FIG. 12 provides a side view of the full course 62 during the dressing step. As shown, full course 62 was placed in dressing area 70 using course lifting device 74. Scaffolding 72 is already set up and provides access for a worker to install roundness ring 250, as well as other pieces of equipment to the outer surface of full course 62. During this step, roundness ring 250 is placed around the circumference of full course 62. A plurality of lifting lugs 252 are attached to roundness ring 250. Lifting lugs 252 allow for packed column section 142 (FIG. 5) to be picked up by the crane. As noted previously, the temporary outer scaffolding can be advantageously removed to allow for full course 62 to be removed from the dressing area even with roundness ring 250 in place. In normal production facilities, packed column section 142 is moved around using trunnions that are welded to the packed column section 142. Advantageously, using the lifting lug in accordance with certain embodiments of the invention allow for a reduced height requirement for lifting, which allows for a lower building height. Certain embodiments of the present invention also require less welding and result in less plate deformation. Additionally, the roundness ring can cause issues with access to the trunnions, making them impracticable when a roundness ring is present.

Figure 28:
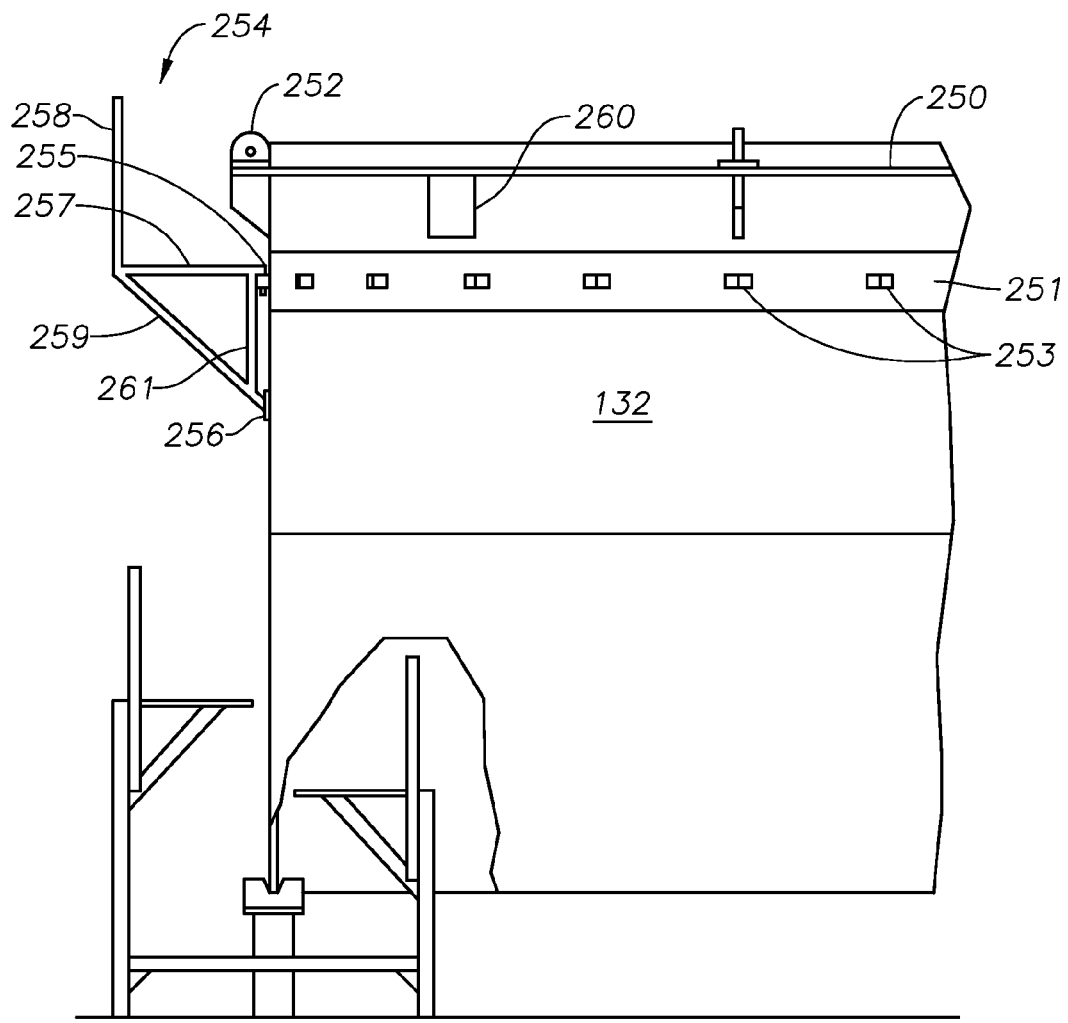
FIG. 28 shows an embodiment of the invention.
Figure 29:
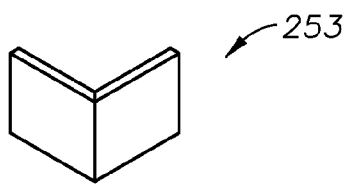
FIG. 29 shows an embodiment of the invention.

In certain embodiment for shells that will become an upper course (i.e., the top shell of a column section), clips 253 are added to the outer surface of full course 62 in order to provide support for a hanging platform in order to give a user access to the top of the column section when installing the distributor and/or packing FIG. 28 provides a side view of second course 132 with clips 253 added to its outer surface. FIG. 29 provides a close-up isometric view of one embodiment of clip 253. In this embodiment, clip 253 is generally v-shaped; however, it is not intended to be so limited. It is preferred that clip 253 be configured such that when clip 253 is secured to the outer surface of second course 132, clip 253 is operable to support the weight of hanging platform 254. In one embodiment, clips 253 can be welded onto the outer surface of second course 132. In an additional embodiment, clips 253 can be welded to either a reinforcement band 251 or clip pads (not shown) instead of being welded directly to the outer surface. For purposes of this application, the phrase clips being secured to the outer surface is meant to encompass all of the above alternatives. Reinforcement band 251 or clip pads can be welded to the outer surface of second course 132. Both of these options help to distribute the force applied by the clips to the outer surface of the second course 132, thereby improving its integrity.

In one embodiment, hanging platform 254 includes adapter 255, foot pad 256, walkway 257, backing 258, angled post 259, and vertical post 261. Adapter 255 is configured to mate with clip 253, which results in a force pulling hanging platform 254 toward second course 132 whenever weight is applied to walkway 257. Footpad 256 can be located at a distal end of angled post 259 and when in use, rests against the side of second course 132. Footpad 256 is configured to disperse the weight of hanging platform 254 against second course 132 without damaging second course 132. In an additional embodiment, hanging platform 254 can also include a vertical extension (not shown) for supporting a roof. In one embodiment, the vertical extension can attach to backing 258, or it can already be incorporated within backing 258 and simply be extended from backing 258. In an additional embodiment, the vertical extension can have a plurality of arms extending out from the vertical extension, such that the plurality of arms are configured to support an external weather shelter that can be used for protection from the environment after the packed course has been moved outside. FIGS. 34-36 provide various views of an embodiment of the external weather shelter.

Figure 13A:
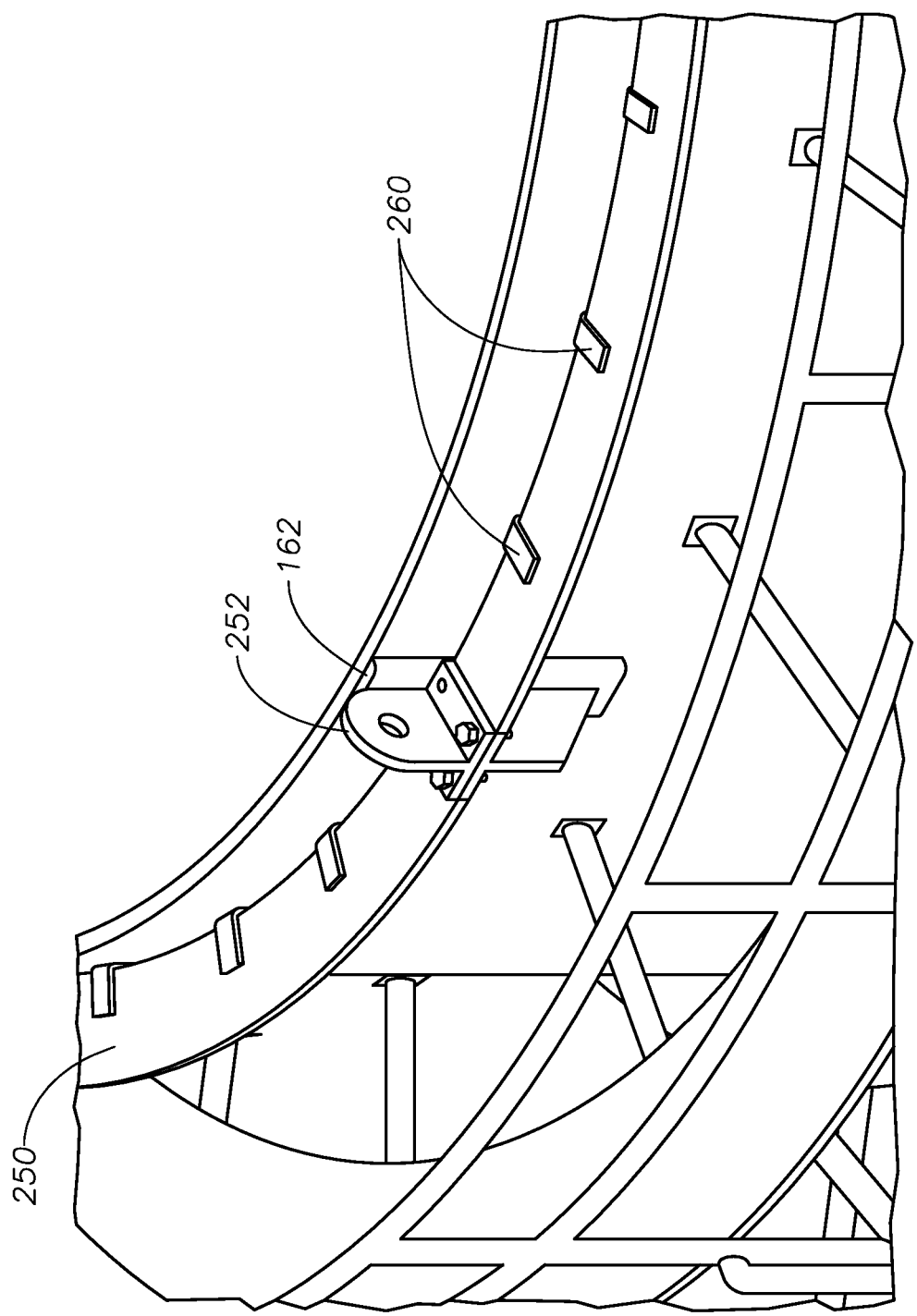
FIG. 13A and FIG. 13B show an embodiment of the invention.
Figure 13B:
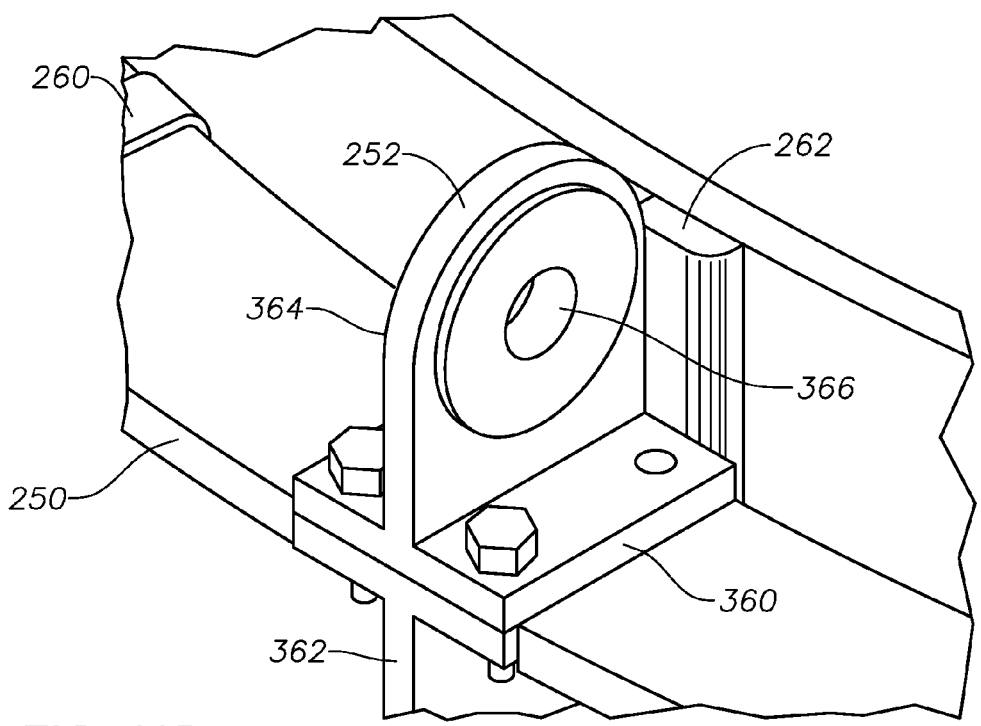

FIG. 13a provides an isometric view of the dressing step. In the embodiment shown, shims 260 can be provided such that roundness ring 250 can accommodate various course thicknesses. In the embodiment shown, shims 260 are generally L-shaped. Also shown in FIG. 13a are reinforcement pads 262. Reinforcement pads 262 are attached to the outer surface of course, preferably by welding. Reinforcement pads 262 are disposed between the course and lifting lug 252 and help to prevent tearing of the course when the course is lifted via lifting lug 252. Roundness ring 250 can preferably be dismantled, such that it can be removed at a later point in time. FIG. 13B provides a close up view of lifting lug 252 and reinforcement pad 262.

Figure 14:
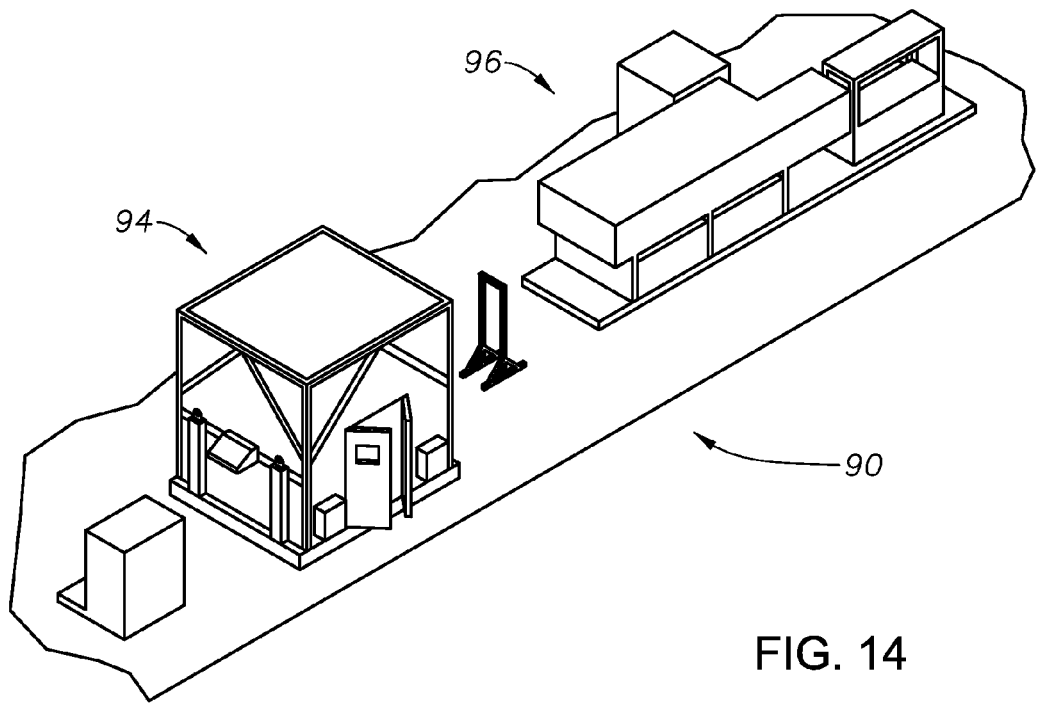
FIG. 14 shows an embodiment of the invention.

FIG. 14 provides an isometric view of packing fabrication area 90. In the embodiment shown, both press module skid 94 and washing and cutting skid 96 are provided on skids, which advantageously allows for both press module skid 94 and washing and cutting skid 96 to be shipped as whole pieces of equipment, and to be at the proper height when in operation. This is an added advantage of certain embodiments of the invention since the flooring in the remote manufacturing locations is not typically a flat and even surface such as in a typical fabrication facility. In certain embodiments, the skids of press module skid 94 and washing and cutting skid 96 are configured to allow for leveling in order to adapt for differences in floor evenness. Additionally, skidding allows for time savings during installation, dismantling, and shipping. Skids also allow for easier shipping in containers.

FIG. 15 provides an isometric view of washing and cutting skid 96. In this embodiment, skid support beams 270 help to provide support and structure for the skid. In a preferred embodiment, washing and cutting skid 96 is manufactured in a local manufacturing facility and then inserted into an appropriate shipping container for transport to the remote manufacturing yard. At location, skid support beams 270 can be maintained or removed depending on the circumstances. As such, washing and cutting skid 96 is configured to be operable with or without skid support beams 270. Additionally, skidding allows for time savings during installation, dismantling, and shipping. Skids also allow for easier shipping in containers.

FIG. 16 provides an isometric view of press module skid 94. In this embodiment, skid support beams 272 help to provide support and structure for the skid. In a preferred embodiment, press module skid 94 is manufactured in a local manufacturing facility and then inserted into an appropriate shipping container or shipped without a container for transport to the remote manufacturing yard. In a preferred embodiment, skid support beams 272 are left in tact during operation. Press module skid 94 also can include walls 274, which help to provide an enclosure for press module skid 94 and reduce some of the noise associated with operation of press module skid 94. Press module skid 94 can also include access door 276 and strip input 278 and strip output (not shown).

Figure 17:
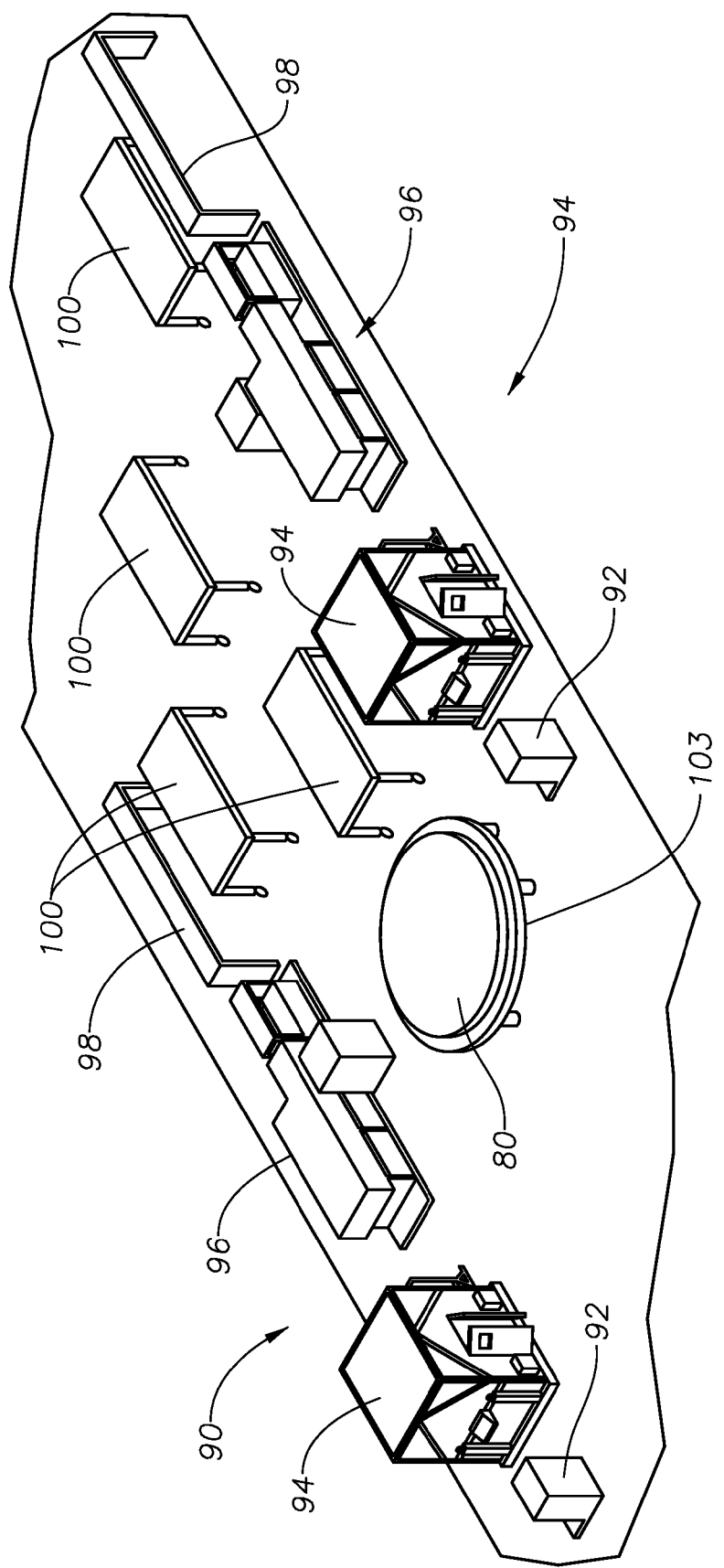
FIG. 17 shows an embodiment of the invention

FIG. 17 provides another close up isometric view of an embodiment where packing fabrication area 90 includes two press module skids 94 and washing and cutting skids 96. Two halves of a distributor are moved onto distributor working table 103 and mated together to form one distributor 80. The embodiment shown in FIG. 17 also includes more than one packing fabrication area 90 for creating packing onsite. In this embodiment, each packing fabrication area 90 includes coil holder 92, press module skid 94, washing and cutting skid 96, reception table 98, and transfer table 100. Coil holder 92 feeds continuous metal strips (preferably aluminum) into press module skid 94 in order to create corrugated packing. From there, the corrugated packing moves to washing and cutting skid 96 to remove oils and other impurities from the corrugated packing, as well as to cut the corrugated packing into its appropriate strip length. After cutting, the packing strips move to reception table 98 where the strips are organized and grouped together before using transfer table 100 to transfer the grouped strips to working table 102 where they are then placed together to form packing assembly 101.

FIG. 18 provides an isometric view of packing lifting device 112. In the embodiment shown, packing lifting device 112 includes a plurality of lifting arms 300 extending outward from central member 304 and connector clips 302 disposed on each lifting arm 300. Packing lifting device 112 is configured to lift a complete packing assembly 101 using connector clips 302 in conjunction with the adapter from packing band 109 and stack the packing assembly 101 onto another packing assembly 101. Preferably, packing lifting device 112 moves packing assembly onto packing pallet 114 so that a plurality of packing assemblies may be moved to building two B2 for installation or storage. In one embodiment, packing lifting device 112 is configured such that lifting arms 300 can be detached from packing lifting device 112 in order to allow for a smaller, more transportable footprint. Other options could include lifting arms 300 that rotate and lock into an open and closed position, which would also result in a smaller footprint. In one embodiment, packing lifting device 112 is configured to be lifted using overhead crane 110 via lifting point 306.

FIG. 19 provides a close-up isometric view of packing pallet 114 and trailer 116 without any packing loaded onto packing pallet 114. In the embodiment shown, packing pallet 114 includes pallet support legs 111 and packing support structure 113. In one embodiment, packing support structure 113 is configured to be able to support the weight of packing, which can be in excess of 34,000 lbs. Support legs 111 not only provide support for packing pallet 114, but they also advantageously raise packing support structure 113 off the ground, which allows for trailer 116 to be placed underneath packing pallet 114. When packing pallet 114 is ready to be moved, trailer 116 can be slid underneath packing pallet 114 until lifting members 115 are directly underneath packing support structure 113, such that lifting members 115 can be extended, thereby lifting packing pallet 114 off the ground. Trailer 116 can then be moved using any acceptable machinery, for example, a forklift.

FIG. 20 provides a close-up isometric view of column section assembly area 120. Second course 132 is brought to column section assembly area 120 and welded to the top of first course 134 using horizontal welder 130 to form a column section. In another embodiment (not shown), a third course can also be added if desired. In the embodiment shown, inner scaffolding (not shown) and outer scaffolding 75 are installed such that a user can walk along the inner and outer circumference while horizontal welder 130 is in operation. In one embodiment, automatic flux cored arc welding is used. Horizontal welders are generally known in the art; however, in certain embodiments of the invention, horizontal welder 130 is configured for flux cored arc welding instead of submerged arc welding (as is typically done for horizontal welders known heretofore), and is additionally configured to weld smaller diameters than typical, since horizontal welders are typically used for large storage tanks for refineries having diameters of the order of 40 meters. In another embodiment, a separate horizontal welder 130 is used for inside and outside welding.

In certain embodiments, a backing strip is not used when making the welds. This is because backing strips can cause an accumulation of liquid oxygen and/or hydrocarbons in the area between the backing and the course, which can result in a possible fire hazard. However, in certain embodiments, space on the inside of the course is at a premium, which prevents a user from being on the inside of the course during welding. For example, for certain courses that will enclose the main vaporizer, there can be instances when space does not allow for a user to be inside during welding, such that a backing strip can be used. However, as noted above, the use of a backing strip can lead to possible safety issues.

In order to reduce the risk associated with liquid build-up, drainage holes can be drilled into the backing strip prior to installation. In one embodiment, holes can be drilled at various locations, for example every two meters of back strip. In another embodiment, the location of each drainage hole can be at a point that will be above the circumferential weld, such that any liquid that falls between the backing strip and the course will be able to travel through the drainage holes. If the entire hole were below the circumferential weld, then the liquid would not be able to drain from behind the backing strip and become trapped. As such, it is preferable to have drainage holes located on the backing strips in a proper location such that the drainage holes are configured to allow drainage of any trapped liquid during operation. Drainage holes can be round, oblong, or any other shape that allows for drainage of the liquid.

FIG. 21 provides a close-up isometric view of optional cleaning station 320. In the embodiment shown, a user can be raised and lowered within column section 138 via scissor lift 322 such that user can wash the inside of the welded column sections to remove oil and/or debris. In certain embodiments, welded column sections are raised up off the floor via cleaning station support 324, which gives user access to the inside and outside the welded column sections.

FIG. 22 provides an elevation view of packing and distributor installation area 140, wherein the packing and distributors from building one B1 are then lifted and installed within column section 138 using packing installation device 141. In one embodiment, distributor 80 is installed first with packing assembly 101 being installed on top of distributor 80. In one embodiment, packing installation device 141 can include cage 143 and adapter ring plate 145. Cage 143 is securely attached to adapter ring plate 145. Adapter ring plate 145 can have a locking mechanism that is configured to engage with adapter 147 thereby transferring a lifting force to packing assembly 101.

In certain embodiments, the packing can be installed band by band, as an assembly (i.e., the entire circle), or in portions. When in portions, the packing would arrive in boxes, a worker would enter the inside of column section 138, the boxes would be lowered into column section 138 and the worker would then remove the portions from the box and manually fill in the area until completed. Once the packing and distributor(s) are installed, the packed column section is then moved from building two B2 to outdoor yard 10.

Figure 23:
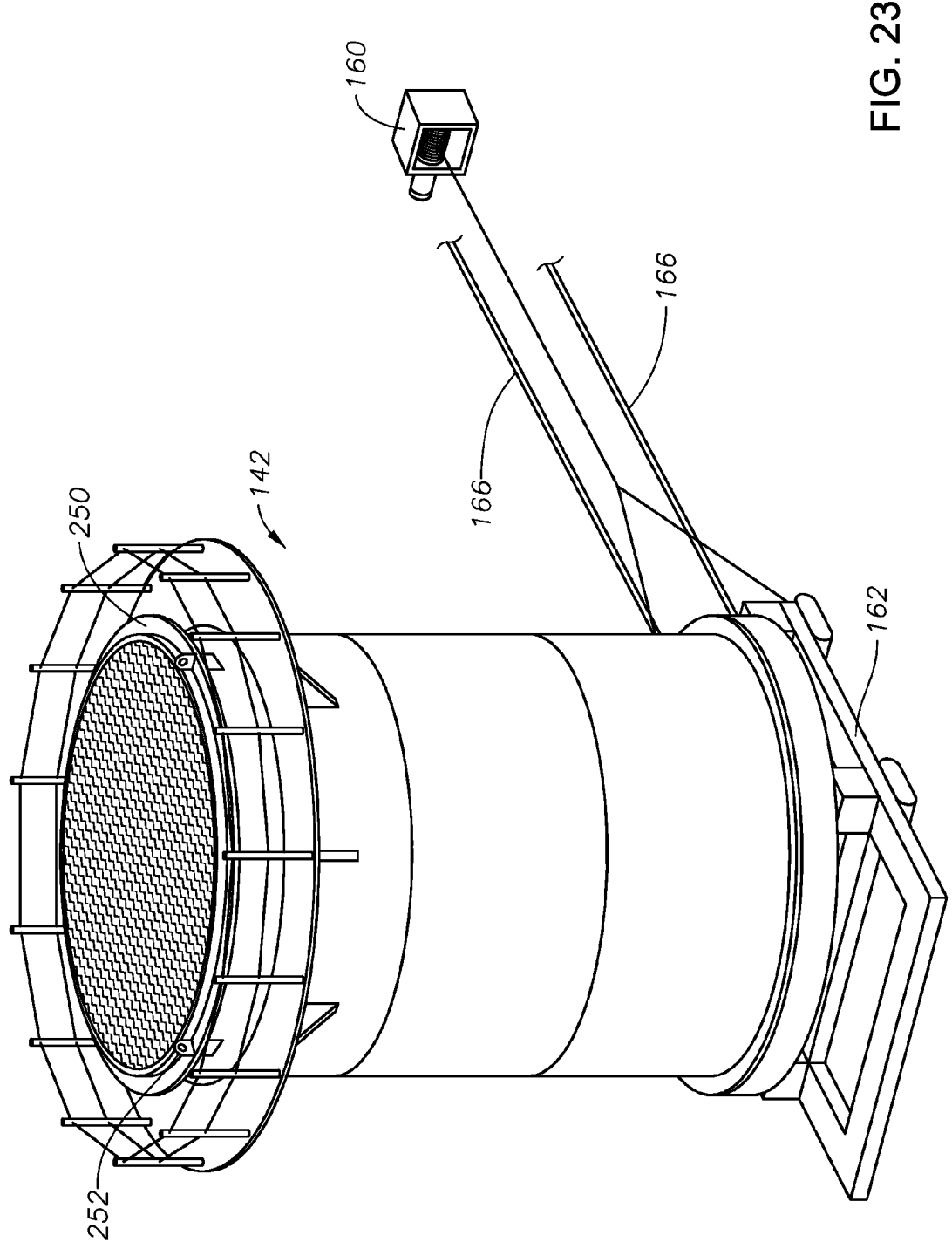
FIG. 23 shows an embodiment of the invention.
Figure 24B:
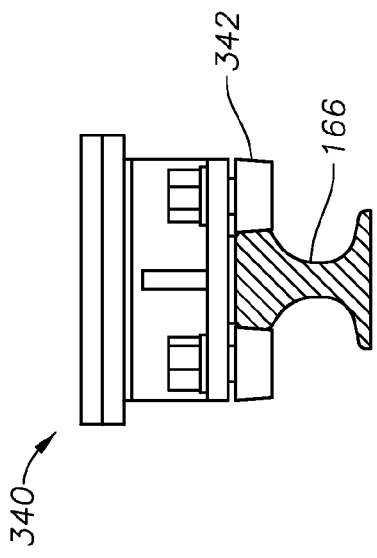
FIG. 24A, FIG. 24B, FIG. 24C and FIG. 24D show an embodiment of the invention.
Figure 24A:
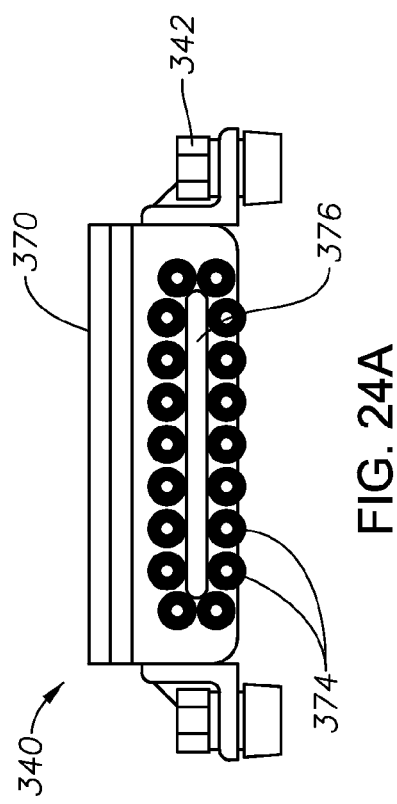
Figure 24D:
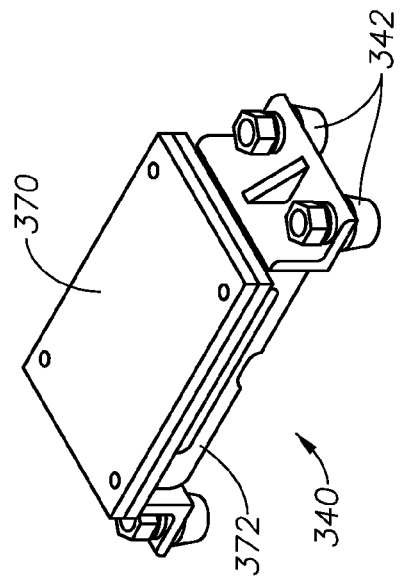
Figure 24C:
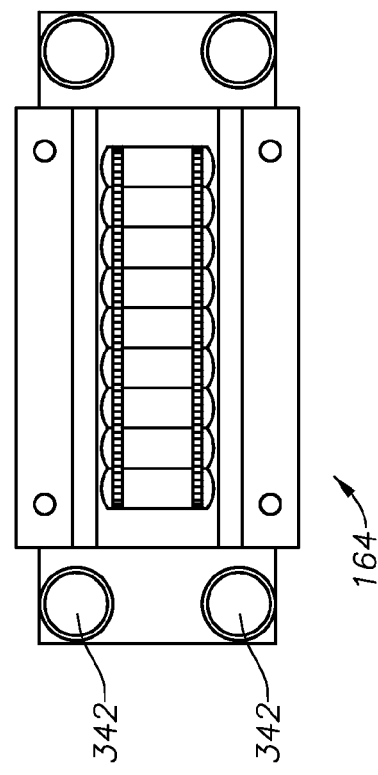

FIG. 23 provides one embodiment for moving the packed column sections from building two B2 to the outside yard. In this embodiment, winch 160 is used to move packed column section 142. Packed column section 142 is located on top of movable platform 162, with movable platform 162 being configured to support the weight of the packed column section 142. Additionally, movable platform 162 is configured to be attached to a cable from winch 160, such that winch 160 can cause movable platform 162 to progress towards winch 160. In one embodiment, movable platform 162 can include a plurality of multi-ton rollers (340 in FIG. 24) which are adapted to mate with a set of rails 166 disposed on the ground such that rails 166 help to guide movable platform 162 towards winch 160 without movable platform 162 drifting left or right. In one embodiment, winch 160 is secured to the ground or flooring. Rails 166 can be located on top of the ground, or they can be recessed in the ground, such that the flooring has a generally flat surface.

FIGS. 24a-d provides an embodiment of multi-ton roller 340. In the embodiment shown, multi-ton roller 340 includes a set of roller guides 342, which are configured to mate with rails 166. While multi-ton rollers are generally well known and can be purchased from Hilman Inc, certain embodiments of the invention use multi-ton rollers that have been adapted such that they are configured to mate with rails 166 via guides 342 and can be attached to movable platform 162 via top plate 370. In one embodiment, multi-ton roller 340 can include body frame 372, top plate 370 secured to body frame 372, a plurality of individual rollers 374 movable about load-bearing member 376 and located within body frame 372, wherein rollers 374 are configured to support body frame 372 and facilitate longitudinal movement of body frame 372 along the length of rail 166. Guides 342 help to prevent lateral movement of the multi-ton roller during movement along rail 166.

Figure 25A:
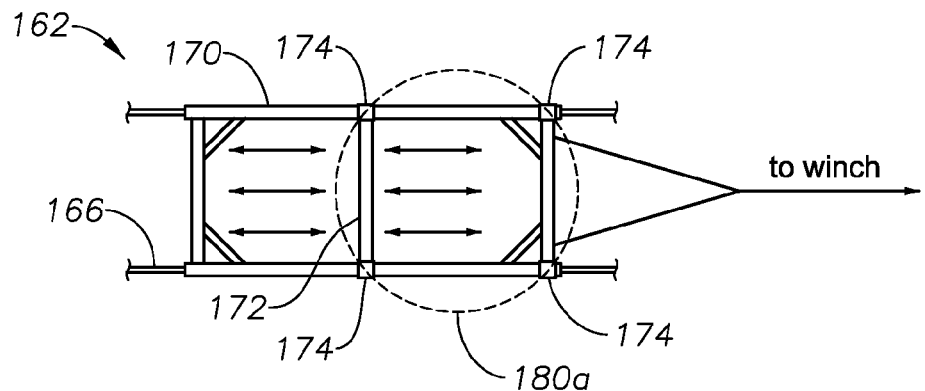
FIG. 25A, FIG. 25B and FIG. 25C show an embodiment of the invention.
Figure 25B:
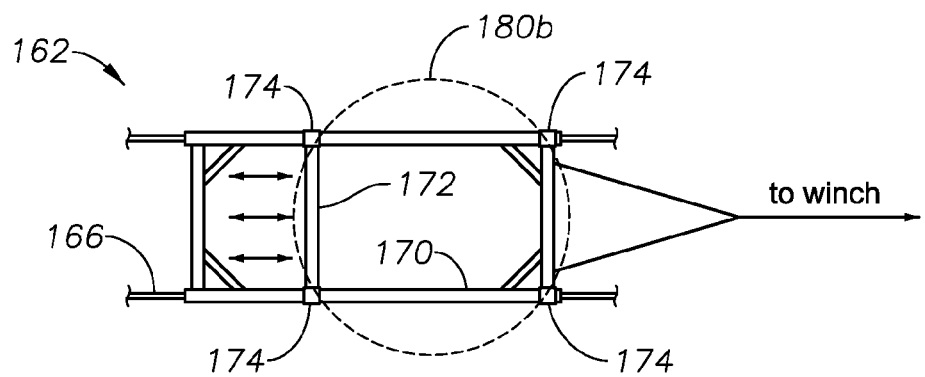
Figure 25C:
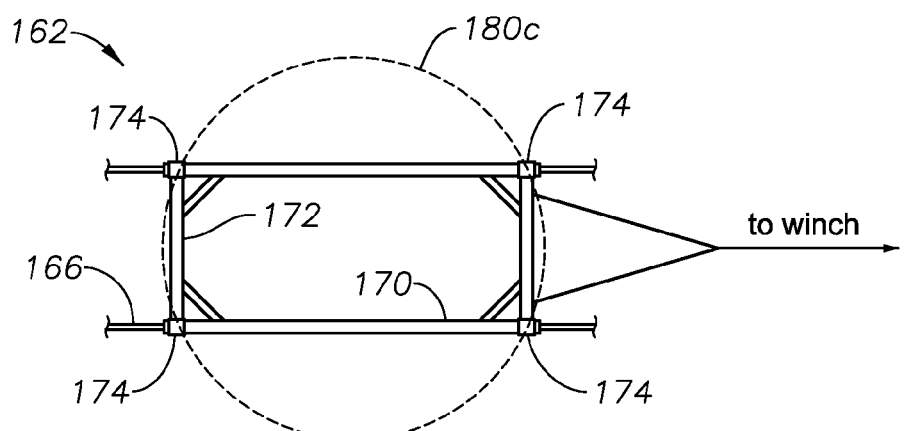

FIG. 25a, FIG. 25b, and FIG. 25c provide top views of movable platform 162 in various configurations. In the embodiments shown, movable platform 162 includes base frame 170, movable beam 172, and table posts 174. As shown by the arrows, movable beam 172 can be moved about base frame 170, such that movable platform 162 can accommodate support bases 180 of different diameters, which allows movable platform 162 to be highly adaptable for different column section diameters. In one embodiment, table posts 174 extend upward (i.e., out of the paper) such that the packed column section is elevated from the ground, thereby allowing a user access to the underside of the packed column section. In one embodiment, support base 180 has a washer-like shape, such that support base 180 has an outer and inner circumference and a height. In another embodiment, table posts 174 are configured to mate with notches in support base 180. This advantageously helps to stabilize support base 180 on top of movable platform 162, particularly when being moved or in the event of severe wind. In certain embodiments, support base 180 is made from structural carbon steel. Support base 180 helps to distribute the weight of packed column section 142 more evenly, and thereby reduce the risk of damage to the shell of packed column section 142. In certain embodiments, packed column section 142 can be secured to support base 180, preferably using welding stiffener. However, those of ordinary skill in the art will recognize that the shape can be any that will allow for placement of a packed column section and provide the needed support, such as a nut, hexagon, octagon, etc. . . . as non-limiting examples.

In one embodiment, the portion of the column that will house the main vaporizer at the bottom of the low pressure column can be placed on movable platform 162 without using support base 180 during transportation from building two B2 to column assembly area 150.

Figure 26A:
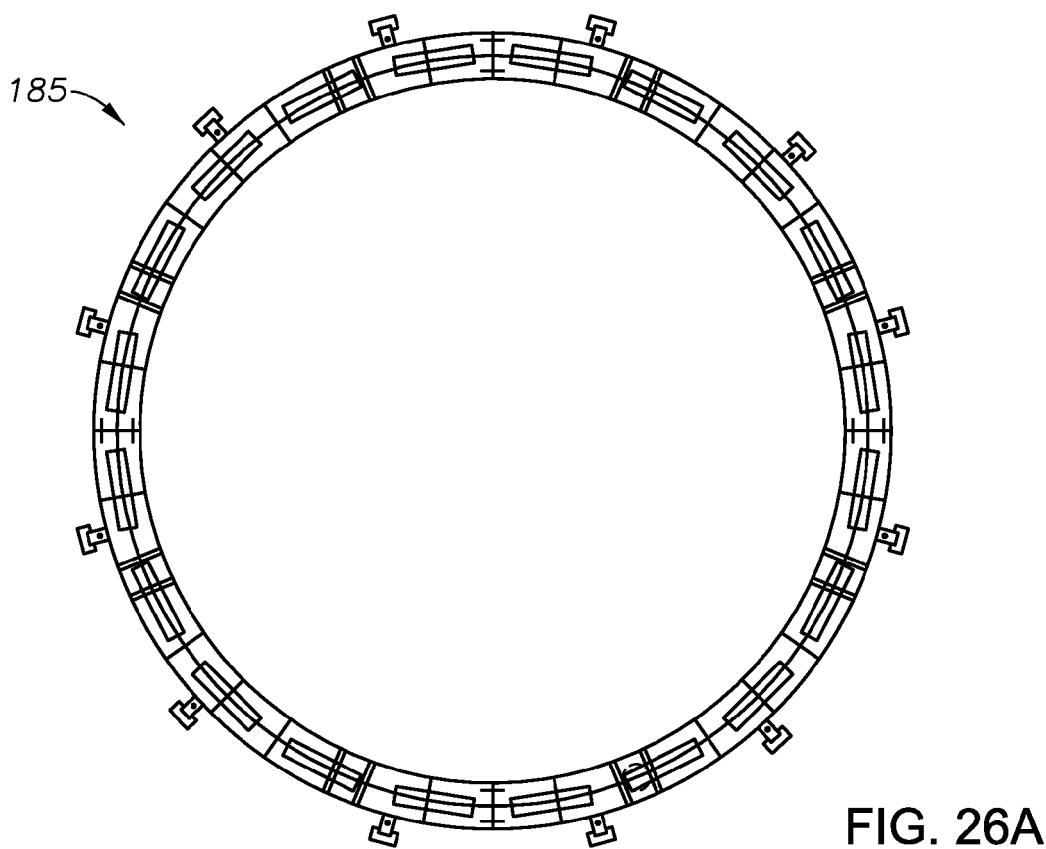
FIG. 26A, FIG. 26B and FIG. 26C show an embodiment of the invention.
Figure 26B:
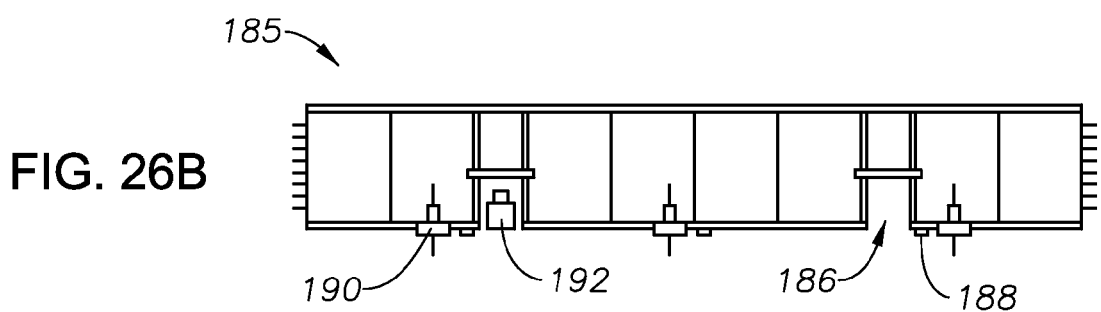
Figure 26C:
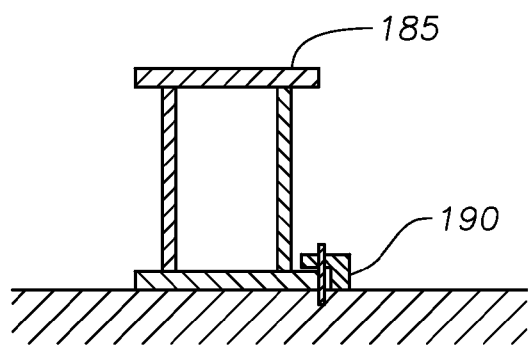

FIG. 26a provides a top view of yard leveling base 185 and FIG. 26b provides a side view of yard leveling base 185. Yard leveling base 185 can be used to assist with creating a level surface for which to stack column 156 on top. In normal manufacturing facilities, yard leveling base 185 would not normally be used as the flooring of the permanent shops is made to be level. However, there will be certain situations encountered where the floor of outdoor yard 10 of remote manufacturing facility 10 will not be substantially level. In these cases, a certain amount of variance in leveling could cause uneven stresses on column 156, and ultimately lead to either unsafe conditions and/or an off-spec column. Therefore, yard leveling base 185 can be used to alleviate some of these problems. In the embodiment shown, yard leveling base 185 has a washer-like shape, such that yard leveling base 185 has an outer and inner circumference, and a height. However, those of ordinary skill in the art will recognize that the shape can be any that will allow for placement of a packed column section and provide the needed support, such as a nut, hexagon, octagon, etc. . . . as non-limiting examples. In certain embodiments, the entire circumference does not have to be resting directly on a surface; however, it is preferred to have as much of the bottom circumference resting on a surface in order to minimize deformations of the shell due to the weight.

In one embodiment, yard leveling base 185 includes a plurality of notches 186 spaced about the circumference that are configured to allow for lifting system 192 to be placed within notches 186 and raise the level of that area, such that leveling can be achieved. In one embodiment, lifting system 192 can be selected from the group consisting of a hydraulic lift, a screw lift, an air lift, and combinations thereof. A jack would be an example of a hydraulic lift. In one embodiment, yard leveling base 185 can accommodate a weight of about 100 metric tons. In one embodiment, shims 188 can be installed at a location near notches 186 and underneath yard leveling base 185 after being raised in order to maintain the leveling after the jack is removed. In one embodiment, a clamp system can be used to secure yard leveling base 185 to the ground. In one embodiment, anchor bolts or their mechanical equivalents can be used. In one embodiment, a plumb line can be used to assist with leveling. In one embodiment, a plumb line is attached to an upper portion of packed column section and the plumb line is allowed to hang freely. The distance of the plumb line from the top of the packed column is a known value, and the yard leveling base is adjusted until the measured distance of the plumb line near the bottom of the packed column matches the known distance.

Figure 27C:
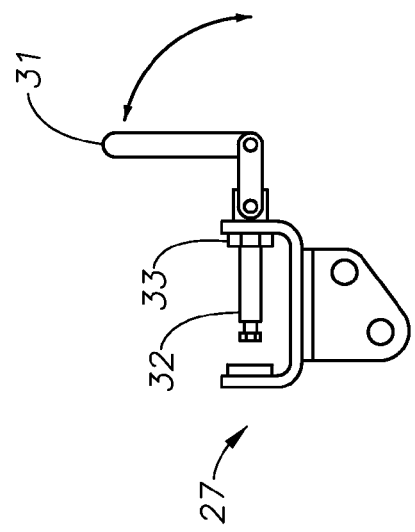
FIG. 27A, FIG. 27B and FIG. 27C show an embodiment of the invention.
Figure 27A:
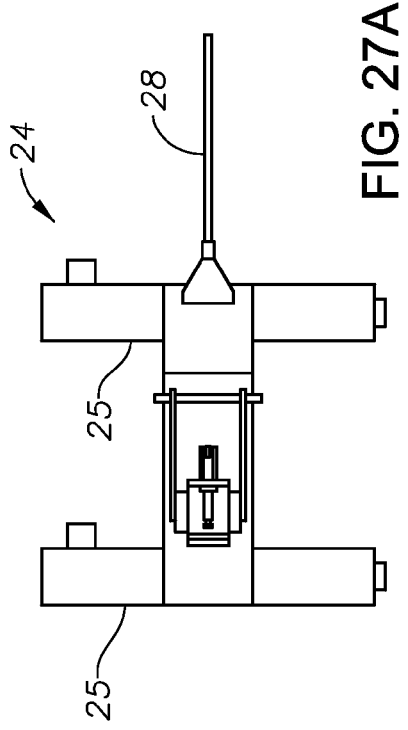
Figure 27B:
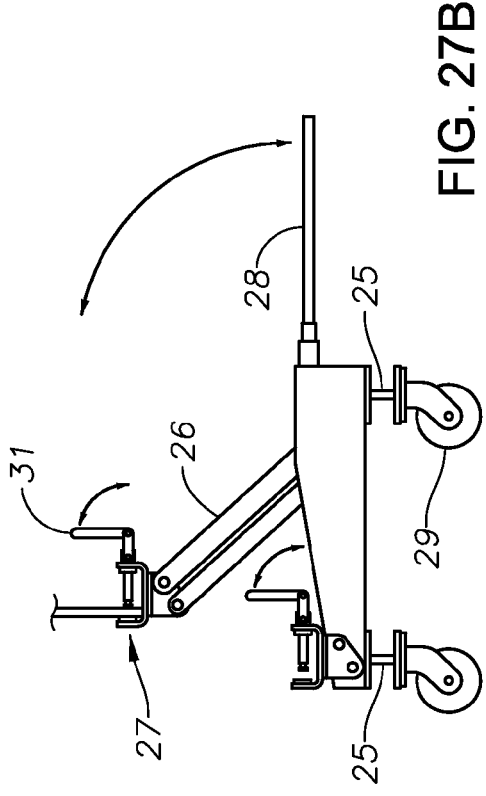

FIG. 27 includes several views of one embodiment of trolley 24. In the embodiment shown, trolley 24 has support body 25, lifting arm 26, plate holder 27, pump handle 28, and wheels 29. In one embodiment, plate holder 27 is rotatably attached, via a support bracket, to lifting arm 26 such that when lifting arm 26 moves between its lowermost and uppermost position, plate holder 27 rotates relative to lifting arm 26 thereby keeping any plate 22 being held by plate holder 27 in a substantially vertical position. Pump handle 28 is configured to cause lifting arm 26 to move, which, in one embodiment, is similar to a pump jack. Support body 25 provides support for trolley 24. In one embodiment, wheels 29 are connected to support body 25. Wheels 29 are preferably a heavy duty kingpin style caster. Plate holder 27 is configured to receive plate 22, secure plate 22 in place, and then subsequently release its grip on plate 22 so that plate 22 can be removed from trolley 24 following rolling. In one embodiment, plate holder 27 includes toggle clamp 31, plate clamp 32, and clamp mounting hex nut 33. Toggle clamp 31 is configured to provide course adjustment to plate clamp 32 and clamp mounting hex nut 33 provides more fine adjustment. In order to lock plate clamp 32 into place, clamp mounting hex nut 33 is turned to adjust the set position of plate clamp 32 and toggle clamp 31 is then moved to cause plate clamp 32 to move toward plate 22 and hold plate 22 firmly in place.

In embodiments in which the remote manufacturing facility will not produce its own packing onsite, the packing can be manufactured in a normal manufacturing facility. In instances where the diameter of the column is small enough, the packing can be broken up into sections and placed in a corresponding box for shipment. As shown in FIG. 30, an entire level of packing can be transported in eight different boxes. Each box 400 is specifically configured to hold a certain portion of the packing. In the embodiment shown, the box has supports 402 built into the box in order to keep the packing in place and protected during shipment.

Figure 31:
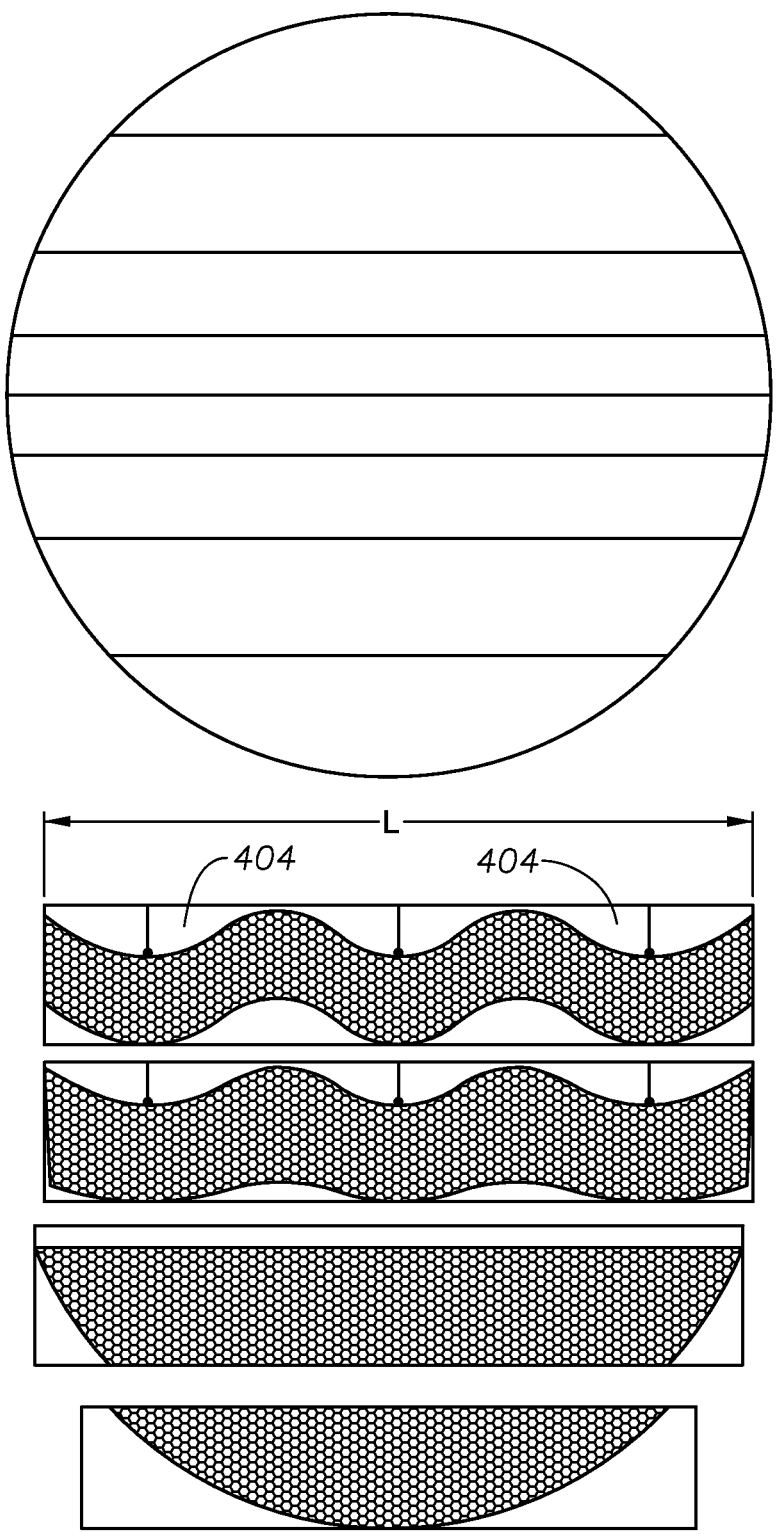
FIG. 31 shows an embodiment of the invention.

There could be instances where the diameter of the packing is too long for shipment, and the packing cannot be made onsite at the remote manufacturing facility. Additionally, in embodiments in which the packing is installed in the column section by box loading, boxes having the packing strips near the middle will be too large to place within the column section. FIG. 31 provides a solution to this problem. In this embodiment, the length of the shipping box for certain portions of the packing is actually less than the length of the strips to be placed in the box (and therefore smaller than the diameter of the column section). In order to accommodate the extra length of the strip, the box contains curved supports 404 that cause the strip to form a wave, which effectively shortens the strips apparent length, thereby allowing strips that would normally be too large for the box to be shipped in a box that is properly sized for transit, and in certain embodiments, placement within the column section during installation.

In certain embodiments, shipping costs can be further reduced by arranging the individual packing strips in a particular way within the boxes. When packing strips are usually installed in boxes, the packing strips are generally oriented the same way as they would be when installed within the column. However, certain embodiments of the invention can include the step of rotating/flipping every other packing strip 180 degrees such that the profiles of successive packing strips are now matched up with each other. FIG. 32 provides an example. As shown during installation, first packing strip A and second packing strip B have offsetting profiles. While this profile setup is advantageous during operation, it can be wasteful during shipment. As shown, the resulting height $H_I$ during installation of two packing strips A,B is $h_A + h_B$.

However, in the embodiment shown, after packing strip A is flipped 180 degrees, its profile matches the profile of packing strip B. Therefore, when the packing strips are placed on top of each other, the overall height during shipping $H_S$ can be reduced since the height of packing strip B is eliminated and only the thickness of B contributes to the overall height of the two packing strips. In typical packing, the height of each packing strip is substantially greater than the thickness of the material, and therefore, a substantial savings in space can be achieved in certain embodiments of the invention.

For embodiments in which vaporizer 350 is manufactured in a normal manufacturing facility (i.e., not at the remote manufacturing facility) and is too big to transport, main vaporizer 350 can be fully manufactured and then cut into at least two sections: lower stage 352 and upper stage 354. In one embodiment, all the work for both lower stage 352 and upper stage 354 can be fully finished in the normal manufacturing facility with the exception that certain process lines and transition joint (TJ) between aluminum and stainless steel can be fully finished in the normal manufacturing facility and delivered to the remote site as one component, with subsequent welding at the remote site. Advantageously, certain embodiments of the invention allow for a condenser that would normally be too large to be transported, to be shipped to the remote site, while also maintaining the highest production standards.

Figure 33:
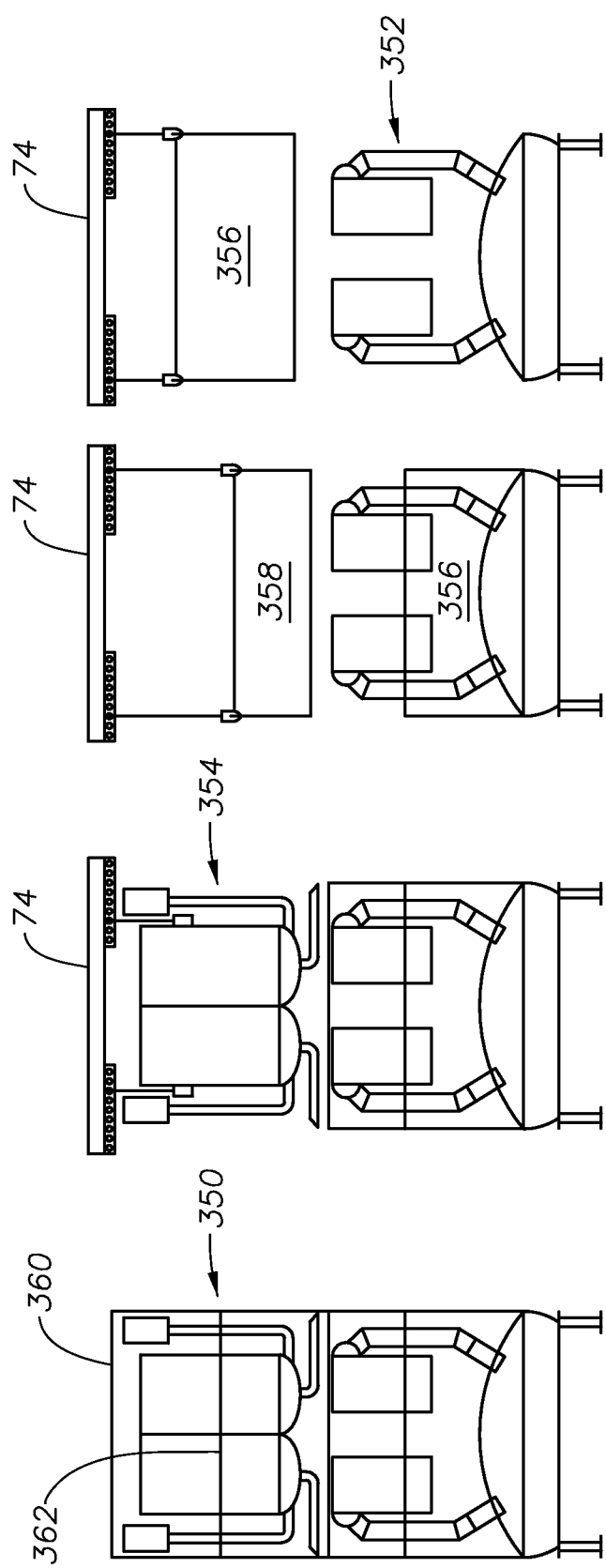
FIG. 33 shows an embodiment of the invention.

FIG. 33 provides an embodiment of the invention in which main vaporizer 350 is installed at the remote site. In the embodiment shown, (starting from the right side) lower stage 352 (two set of four core assembly) is installed first and fit and welded to bottom head. Course lifting device 74 then brings first course 356 (e.g. full course 62) and lowers first course 356 over and around lower stage 352. Second course 358 is then brought and fitted and welded to the top of first course 356. Upper stage 354 (two set of 4 core assembly) is then installed to top of lower stage 352. Two more courses 360 and 362 can then be fit and welded appropriately such that main vaporizer 350 is now enclosed within a column section. In another embodiment, a column section (e.g., two or more courses already welded together) can be installed, as opposed to installing one course at a time.

FIG. 34A provides a side cut out view of weather shelter 500 while FIG. 34B provides a top view of weather shelter 500. Hanging platform 254 is attached to packed column section 142 and hanging platform 254 also helps to provide structural support for weather shelter 500. Frame 502 can attach to hanging platform 254, and preferably extends upwards from hanging platform 254 such that frame 502 is operable to provide support for weather shelter 500 at a height exceeding the height of hanging platform 254. In the embodiment shown, frame 502 can also include posts 504, which can extend upwards from the backing 258 of hanging platform 254. In the embodiment shown, weather shelter 500 includes protective covering 510 that is mounted on the frame. In one embodiment, protective covering 510 has side covering 520 and top covering 530. When protective covering 510 is fully engaged with packed column section 142, inner atmosphere 514 within protective covering 510 is formed, thereby allowing a user to work on the packed column section without being subjected to external weather conditions (e.g., rain, snow, humidity, low or high temperatures, dust, etc. . . . ). In one embodiment, side covering 510 can include access door 540, which provides access for a user to inner atmosphere 514. In the embodiment shown, an upper portion of the side covering 520 is configured to secure to an upper portion (e.g., side arms 506) of the frame and a lower portion of the side covering is configured to secure to the column. In the embodiment shown, the side covering further includes a plurality of door loops 524 configured to receive a door strap 525, wherein the door strap 525 is configured to secure the side covering to the frame when the door strap 525 is tightened. In the embodiment shown, the lower portion of the side covering further includes a plurality of lower side loops 528 configured to receive a lower side strap 529, wherein the lower side strap 529 is configured to secure the lower portion of the side covering to the column when the lower side strap 529 is tightened.

Movable stairs 550 provide access to weather shelter 500. FIG. 34B also shows rails 166 and centering guide rail 167, which can be used to mount winch (not shown). This top view also shows four plumb line access points 512, wherein a plumb line 513 (FIG. 34A) can be hung from the top of the packed column section, go through weather shelter 500 and then dangle at the bottom of the packed column section, to be used for assisting with leveling.

FIG. 35A and FIG. 35B provide a more detailed side view of side covering 520. In the embodiment shown, side covering can include a plurality of wall sections 521a, 521b. FIG. 35A shows the wall sections put together and FIG. 35B shows the wall sections apart. Side covering 520 includes a plurality of upper straps 522, which are configured to attach to side arms 506 of the frame 502 (FIG. 34A and FIG. 34B), thereby providing additional support for side covering 520. Side covering 520 can also contain a plurality of door loops 524. In function, door loops 524 can be similar to belt loops on a pair of pants. In the embodiment shown, a door strap 526 (FIG. 34A) can be inserted into door loops 524 and tightened, for example with a ratchet tightening system, thereby providing a tighter seal. As such, the door strap functions similarly as a belt.

In the embodiment shown, wall sections 521a, 521b can be attached to each other via zipper connections 526. In another embodiment, side covering 520 can also contain a plurality of lower side loops 528 configured to receive a lower side strap, wherein the lower side strap is configured to secure the lower portion of side covering 520 to the packed column section 142 when the lower side strap is tightened.

Figure 36A:
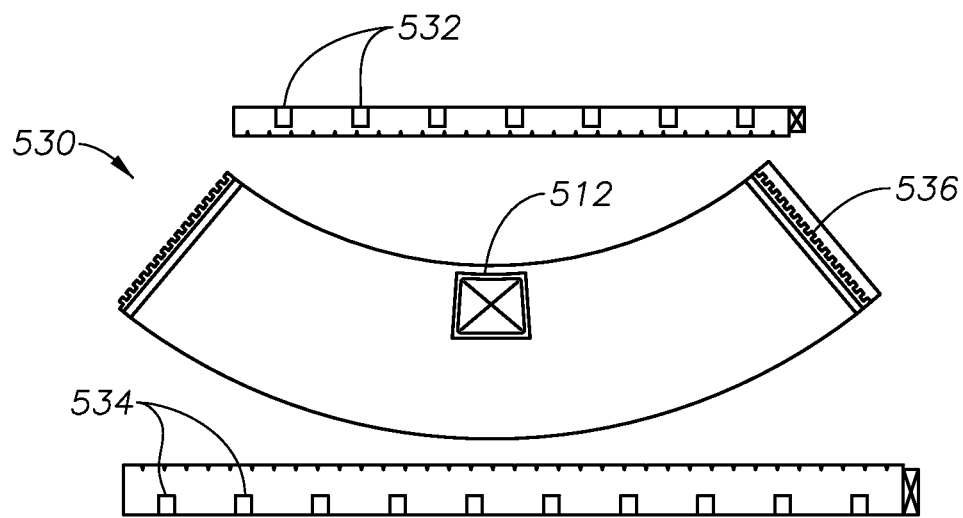
FIG. 36A and FIG. 36B show an embodiment of the invention.
Figure 36B:
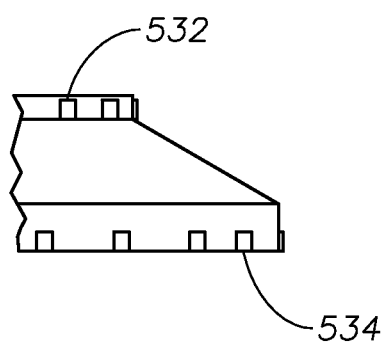

FIG. 36A provides a top view of disassembled top covering 530 and FIG. 36B provides a partial side view of an assembled top covering 530. In the embodiment shown, top covering 530 includes a plurality of upper loops 532 configured to receive an upper strap, wherein the upper strap is configured to secure the top covering to the column when the upper strap is tightened. Top covering 530 can also include a plurality of lower loops 534 configured to receive a lower strap, wherein the lower strap is configured to secure the top covering to the frame when the lower strap is tightened.

In one embodiment, a bottom portion of the top covering surrounds an upper portion of the side covering, such that when the bottom portion of the top covering is secured to the frame, the upper portion of the side covering is secured to the frame. In one embodiment, top covering 530 can include a plurality of top covering sections attached together to form top covering 530. In another embodiment, top covering 530 can also include zippers 536 attached to the ends of the top covering sections, the zippers configured to attach the plurality of top covering sections together. Those of ordinary skill in the art will recognize that embodiments of the invention provide an innovative approach and effective strategy for solving the current limitations of today's technology. Certain embodiments of the invention help to provide manufacturing flexibility and reactivity by allowing additional capacities to current manufacturing techniques; serve all parts of the world, particularly those that are landlocked; reduce the need for oversized transportation equipment; and provide manufacturing capabilities to areas in high growth markets that do not currently have the necessary infrastructure for large transportation equipment.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, language referring to order, such as first and second, should be understood in an exemplary sense and not in a limiting sense. For example, it can be recognized by those skilled in the art that certain steps can be combined into a single step.

The singular forms "a", "an", and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

I claim:

1. A weather shelter for providing protection during assembly of a distillation column at a remote manufacturing yard, the weather shelter comprising:
   a frame mounted to a hanging platform configured to support workers, and extending upwards from the hanging platform, the hanging platform configured to be supported solely by the distillation column when the hanging platform is hung on a curved outer wall of the distillation column during use; and
   a protective covering mounted on the frame, the protective covering having a side covering and a top covering, the protective covering configured to provide an inner atmosphere within the protective covering protected from external elements when the protective covering is secured to the distillation column, wherein the inner atmosphere is within a generally annular area defined between the side covering of the protective covering and the outer wall of the distillation column, wherein the inner atmosphere is substantially enclosed by the protective covering and the outer wall of the distillation column, wherein the entirety of the hanging platform is completely within the inner atmosphere and protective covering, wherein the top covering is configured to receive an upper strap configured to secure the top covering to the distillation column when tightened, wherein a lower portion of the side covering is configured to receive a lower side strap configured to secure the lower portion of the side covering to the distillation column when tightened, and wherein a bottom portion of the top covering is configured to surround an upper portion of the side covering such that when the bottom portion of the top covering is secured to the frame, the upper portion of the side covering is secured to the frame.

2. The weather shelter as claimed in claim 1, wherein the frame comprises vertical posts extending upwards from a backing of the hanging platform.

3. The weather shelter as claimed in claim 1, wherein an upper portion of the top covering is configured to secure to the distillation column and a lower portion of the top covering is configured to secure to the frame.

4. The weather shelter as claimed in claim 1, wherein the top configured to receive the upper strap.

5. The weather shelter as claimed in claim 1, wherein the top covering further comprises a plurality of lower loops configured to receive a lower strap, wherein the lower strap is configured to secure the top covering to the frame when the lower strap is tightened.

6. The weather shelter as claimed in claim 1, wherein the upper portion of the side covering is configured to secure to an upper portion of the frame and the lower portion of the side covering is configured to secure to the distillation column.

7. The weather shelter as claimed in claim 1, wherein the upper portion of the side covering further comprises a plurality of upper side loops configured to receive an upper side strap, wherein the upper side strap is configured to secure the upper portion of the side covering to the frame when the upper side strap is tightened.

8. The weather shelter as claimed in claim 1, wherein the lower portion of the side covering further comprises a plurality of lower side loops configured to receive the lower side strap.

9. The weather shelter as claimed in claim 1, wherein the side covering further comprises upper straps disposed on the upper portion of the side covering, the upper straps configured to attach to side arms of the frame, such that the upper straps provide support for the side covering.

10. The weather shelter as claimed in claim 1, further comprising an access door disposed on a wall section of the side covering, the access door configured to provide access to the inner atmosphere within the protective covering for a user.

11. The weather shelter as claimed in claim 10, wherein the side covering further comprises a plurality of door loops configured to receive a door strap, wherein the door strap is configured to secure a portion of the side covering above the access door to the frame or the hanging platform when the door strap is tightened.

12. The weather shelter as claimed in claim 1, wherein the side covering comprises a plurality of wall sections attached together to form the side covering, wherein each wall section comprises a perimeter having a top end, a bottom end, and two side ends.

13. The weather shelter as claimed in claim 12, wherein the side covering further comprises zippers attached to each side end of the wall sections, the zippers configured to attach the plurality of wall sections together.

14. The weather shelter as claimed in claim 1, wherein the top covering comprises a plurality of top covering sections attached together to form the top covering, wherein each top covering section comprises a perimeter having a top end, a bottom end, and two side ends.

15. The weather shelter as claimed in claim 14, wherein the top covering further comprises zippers attached to each side end of the top covering sections, the zippers configured to attach the plurality of top covering sections together.

16. The weather shelter as claimed in claim 1, wherein the top covering comprises a plumb line access configured to provide access for a plumb line while maintaining the inner atmosphere within the weather shelter.

17. The weather shelter as claimed in claim 1, wherein the distillation column is at least 5 meters in diameter.

18. The weather shelter as claimed in claim 1, wherein the inner atmosphere of the protective covering is adapted to receive a portable heater or air conditioning.

19. The weather shelter as claimed in claim 1, wherein the hanging platform comprises:
   a walkway configured to allow a user to walk about the hanging platform;
   a backing extending vertically from the walkway at a point configured to be distal from the distillation column, wherein the distillation column has a diameter of at least 5 meters;
   an angled post extending at an angle down and away from the walkway;

a foot pad disposed on an end of the angled post, the foot pad configured to rest against an outer surface of the distillation column;

a vertical post connecting the walkway to the angled post; and an adapter disposed on the walkway at a point configured to be proximal to an outer surface of the distillation column, wherein the adapter is configured to mate with a clip attached to the distillation, such that when a downward force is applied to the walkway, the clip is configured to prevent the walkway from falling toward the Earth.

* * * * *